US012573299B2

(12) United States Patent
Shuman et al.

(10) Patent No.: US 12,573,299 B2
(45) Date of Patent: Mar. 10, 2026

(54) NETWORK BASED SENSOR SHARING FOR COMMUNICATIONS SYSTEMS

(71) Applicant: QUALCOMM Incorporated, San Diego, CA (US)

(72) Inventors: Mohammed Ataur Rahman Shuman, San Diego, CA (US); Dan Vassilovski, Del Mar, CA (US); Amit Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/706,058

(22) Filed: Mar. 28, 2022

(65) Prior Publication Data

US 2023/0306849 A1     Sep. 28, 2023

(51) Int. Cl.
*G08G 1/16* (2006.01)
*H04W 4/40* (2018.01)

(52) U.S. Cl.
CPC ............. *G08G 1/163* (2013.01); *G08G 1/165* (2013.01); *G08G 1/166* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 8,954,252 | B1 * | 2/2015 | Urmson | G08G 1/167 |
| | | | | 701/301 |
| 8,983,771 | B2 * | 3/2015 | Breed | G08G 1/166 |
| | | | | 701/423 |
| 9,430,944 | B2 * | 8/2016 | Grimm | G08G 1/0129 |
| 11,092,696 | B2 * | 8/2021 | Eriksson | B60R 21/23138 |
| 11,153,721 | B2 * | 10/2021 | Graefe | G08G 5/0013 |
| 11,304,123 | B1 * | 4/2022 | Noonan | H04W 48/16 |
| 11,449,073 | B2 * | 9/2022 | Lin | G05D 1/0246 |
| 11,572,075 | B2 * | 2/2023 | Stenneth | G07C 5/0816 |
| 2012/0283895 | A1 * | 11/2012 | Noda | B60W 30/0953 |
| | | | | 701/1 |
| 2013/0179198 | A1 * | 7/2013 | Bowne | G07C 5/08 |
| | | | | 705/4 |
| 2013/0191001 | A1 * | 7/2013 | Buecker | G01C 21/36 |
| | | | | 701/70 |

(Continued)

OTHER PUBLICATIONS

International Search Report and Written Opinion—PCT/US2023/063375—ISA/EPO—May 15, 2023.

*Primary Examiner* — Muhammad Adnan
(74) *Attorney, Agent, or Firm* — QUALCOMM Incorporated

(57) ABSTRACT

Systems and techniques are described for providing an enhanced vehicle-to-everything (V2X) see-though use case. For example, a method for wireless communication at a network entity may include receiving, at the network entity, sensor data from one or more devices, the sensor data comprising at least one of sensing measurements associated with one or more objects in an environment or information associated with a respective device of the one or more devices. The method may include generating, at the network entity, one or more advisory messages for one or more recipient vehicles based on at least a portion of the sensor data. The method may further include transmitting, from the network entity, the one or more advisory messages to the one or more recipient vehicles.

30 Claims, 20 Drawing Sheets

Obstacle detection

(56)          References Cited

U.S. PATENT DOCUMENTS

| | | | | |
|---|---|---|---|---|
| 2014/0303829 A1* | 10/2014 | Lombrozo | G01S 13/88 | 701/23 |
| 2014/0376400 A1* | 12/2014 | Kanamarlapudi | H04W 28/0273 | 370/253 |
| 2016/0129834 A1* | 5/2016 | Lee | G08G 1/167 | 340/903 |
| 2016/0330394 A1* | 11/2016 | Shahraray | H04W 4/70 | |
| 2016/0363935 A1* | 12/2016 | Shuster | G08G 1/0141 | |
| 2017/0053530 A1* | 2/2017 | Gogic | H04L 67/12 | |
| 2017/0072851 A1* | 3/2017 | Shenoy | G08G 1/096775 | |
| 2017/0132922 A1* | 5/2017 | Gupta | B60K 35/10 | |
| 2017/0276504 A1* | 9/2017 | Lu | G08G 1/096816 | |
| 2018/0032076 A1* | 2/2018 | Lombrozo | G01S 17/88 | |
| 2018/0040246 A1* | 2/2018 | Yonemura | H04W 4/027 | |
| 2018/0242115 A1 | 8/2018 | Kim et al. | | |
| 2018/0261097 A1* | 9/2018 | Jiang | G08G 1/163 | |
| 2018/0328734 A1* | 11/2018 | Kasslatter | G01C 21/30 | |
| 2018/0365909 A1* | 12/2018 | Cheng | H04Q 9/00 | |
| 2019/0294966 A1* | 9/2019 | Khan | B60W 50/00 | |
| 2020/0133288 A1* | 4/2020 | Abari | G05D 1/0088 | |
| 2020/0177277 A1* | 6/2020 | Seyvet | H04B 10/116 | |
| 2020/0191601 A1* | 6/2020 | Jiang | G01C 21/3859 | |
| 2020/0327806 A1 | 10/2020 | Lekutai | | |
| 2020/0342760 A1* | 10/2020 | Vassilovski | G05D 1/693 | |
| 2021/0004011 A1* | 1/2021 | Oh | G08G 1/0145 | |
| 2021/0241623 A1* | 8/2021 | Wang | G08G 1/164 | |
| 2022/0172625 A1* | 6/2022 | Chou | G08G 1/164 | |
| 2023/0059588 A1* | 2/2023 | Zhao | H04W 4/40 | |
| 2023/0154249 A1* | 5/2023 | Das | G05D 1/024 | 701/31.4 |
| 2024/0069148 A1* | 2/2024 | Baek | G01S 5/0221 | |
| 2024/0096212 A1* | 3/2024 | Khosla | H04W 40/20 | |
| 2025/0061522 A1* | 2/2025 | Fields | G07C 5/0816 | |
| 2025/0095481 A1* | 3/2025 | Large | G08G 1/065 | |

* cited by examiner

FIG. 8

| Vehicle Speed (mph) | Vehicle Speed (meters per second) | Friction Coefficient | Stopping Distance (meters) | Reaction Time(s) | Safe Distance (meters) | Safe Distance (feet) |
|---|---|---|---|---|---|---|
| 15 | 6.71 | 0.6 | 3.82 | 1.5 | 13.88 | 45.53 |
| 30 | 13.41 | 0.6 | 15.29 | 1.5 | 35.41 | 116.15 |
| 45 | 20.12 | 0.6 | 34.41 | 1.5 | 64.59 | 211.85 |
| 50 | 22.35 | 0.6 | 42.48 | 1.5 | 76.01 | 249.32 |
| 60 | 26.82 | 0.6 | 61.18 | 1.5 | 101.41 | 332.63 |
| 70 | 31.29 | 0.6 | 83.27 | 1.5 | 130.21 | 427.08 |

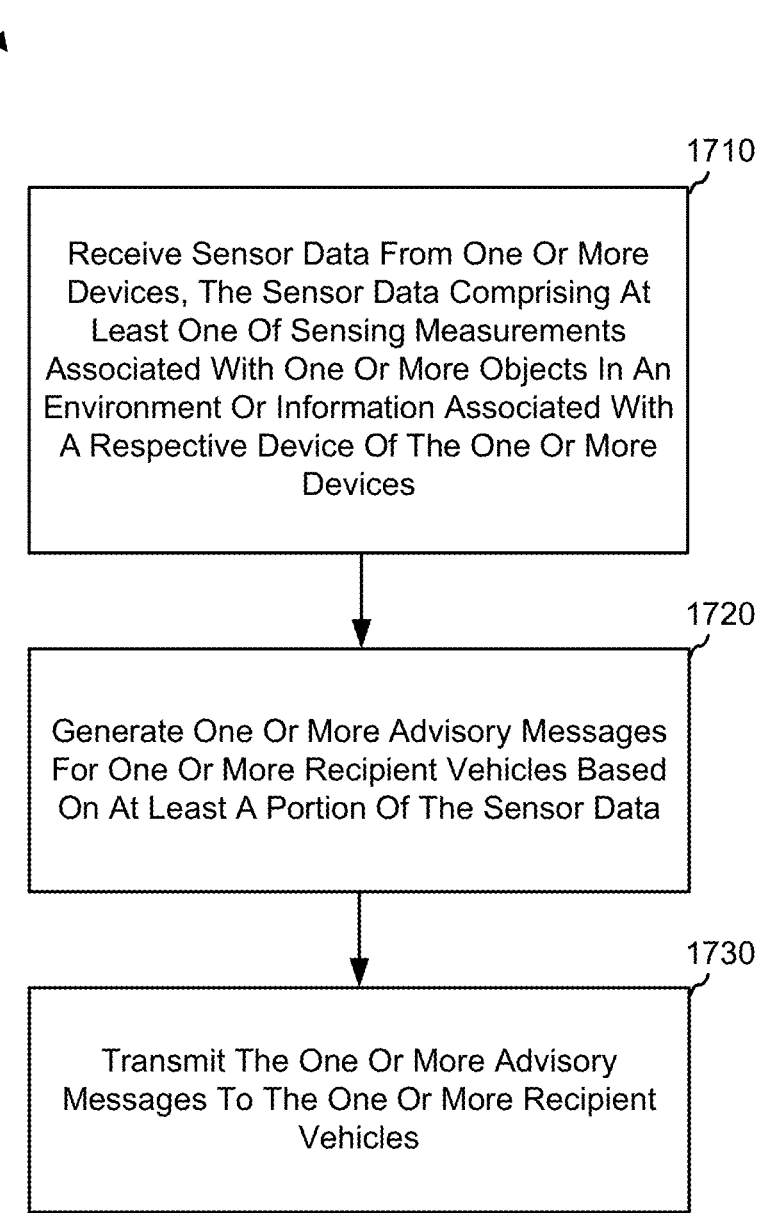

1710

Receive Sensor Data From One Or More Devices, The Sensor Data Comprising At Least One Of Sensing Measurements Associated With One Or More Objects In An Environment Or Information Associated With A Respective Device Of The One Or More Devices

1720

Generate One Or More Advisory Messages For One Or More Recipient Vehicles Based On At Least A Portion Of The Sensor Data

1730

Transmit The One Or More Advisory Messages To The One Or More Recipient Vehicles

FIG. 17

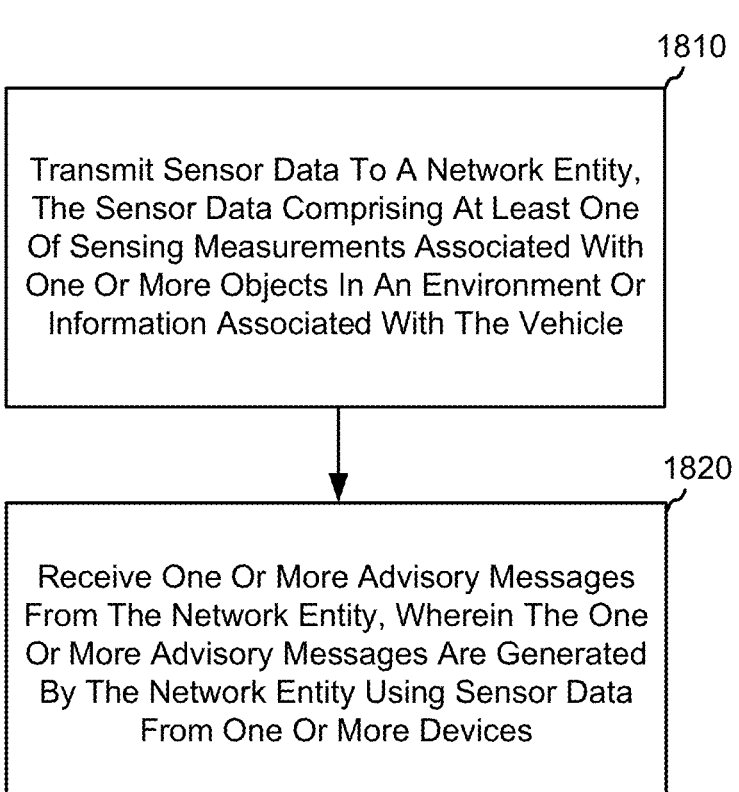

1800

1810

Transmit Sensor Data To A Network Entity, The Sensor Data Comprising At Least One Of Sensing Measurements Associated With One Or More Objects In An Environment Or Information Associated With The Vehicle

1820

Receive One Or More Advisory Messages From The Network Entity, Wherein The One Or More Advisory Messages Are Generated By The Network Entity Using Sensor Data From One Or More Devices

FIG. 18

NETWORK BASED SENSOR SHARING FOR COMMUNICATIONS SYSTEMS

FIELD

The present disclosure relates generally to communication systems. For example, aspects of the present disclosure relate to providing network based sensor sharing for communications systems, such as vehicle-to-everything (V2X) systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise communications between devices, such as in V2X, vehicle-to-vehicle (V2V), and/or device-to-device (D2D) communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for providing network based sensor sharing for communications systems (e.g., V2X) systems). According to at least one example, a method is provided for wireless communication. The method includes: receiving, at a network entity, sensor data from one or more devices, the sensor data comprising at least one of sensing measurements associated with one or more objects in an environment or information associated with a respective device of the one or more devices; generating, at the network entity, one or more advisory messages for one or more recipient vehicles based on at least a portion of the sensor data; and transmitting, from the network entity, the one or more advisory messages to the one or more recipient vehicles.

In another example, an apparatus for wireless communication is provided that includes at least one memory and at least one processor coupled to the at least one memory. The at least one processor is configured to: receive sensor data from one or more devices, the sensor data comprising at least one of sensing measurements associated with one or more objects in an environment or information associated with a respective device of the one or more devices; generate one or more advisory messages for one or more recipient vehicles based on at least a portion of the sensor data; and transmit the one or more advisory messages to the one or more recipient vehicles.

In another example, a non-transitory computer-readable medium of a network entity is provided that has stored thereon instructions that, when executed by one or more processors, cause the one or more processors to: receive sensor data from one or more devices, the sensor data comprising at least one of sensing measurements associated with one or more objects in an environment or information associated with a respective device of the one or more devices; generate one or more advisory messages for one or more recipient vehicles based on at least a portion of the sensor data; and transmit the one or more advisory messages to the one or more recipient vehicles.

In another example, an apparatus for wireless communication is provided. The apparatus includes: means for receiving sensor data from one or more devices, the sensor data comprising at least one of sensing measurements associated with one or more objects in an environment or information associated with a respective device of the one or more devices; means for generating one or more advisory messages for one or more recipient vehicles based on at least a portion of the sensor data; and means for transmitting the one or more advisory messages to the one or more recipient vehicles.

In some aspects, the apparatus is, or is part of, a network entity (e.g., a multi-access edge computing (MEC) device, a base station, a central unit of a base station, or a distributed unit of a base station). In other aspects, the apparatus may be a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle (e.g., an automobile or truck), a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 is a diagram illustrating an example of sensor-sharing for cooperative and automated driving systems, in accordance with some aspects of the present disclosure.

FIG. 16 is a table showing example required safe stopping distances for vehicles traveling at different speeds, which may be used to determine the required distance needed for safe operation of a vehicle, in accordance with some aspects of the present disclosure.

FIG. 17 is a flow diagram illustrating an example of a process for wireless communication, in accordance with some aspects of the present disclosure.

FIG. 18 is a flow diagram illustrating an example of a process for wireless communication, in accordance with some aspects of the present disclosure.

DETAILED DESCRIPTION

Figure 1:
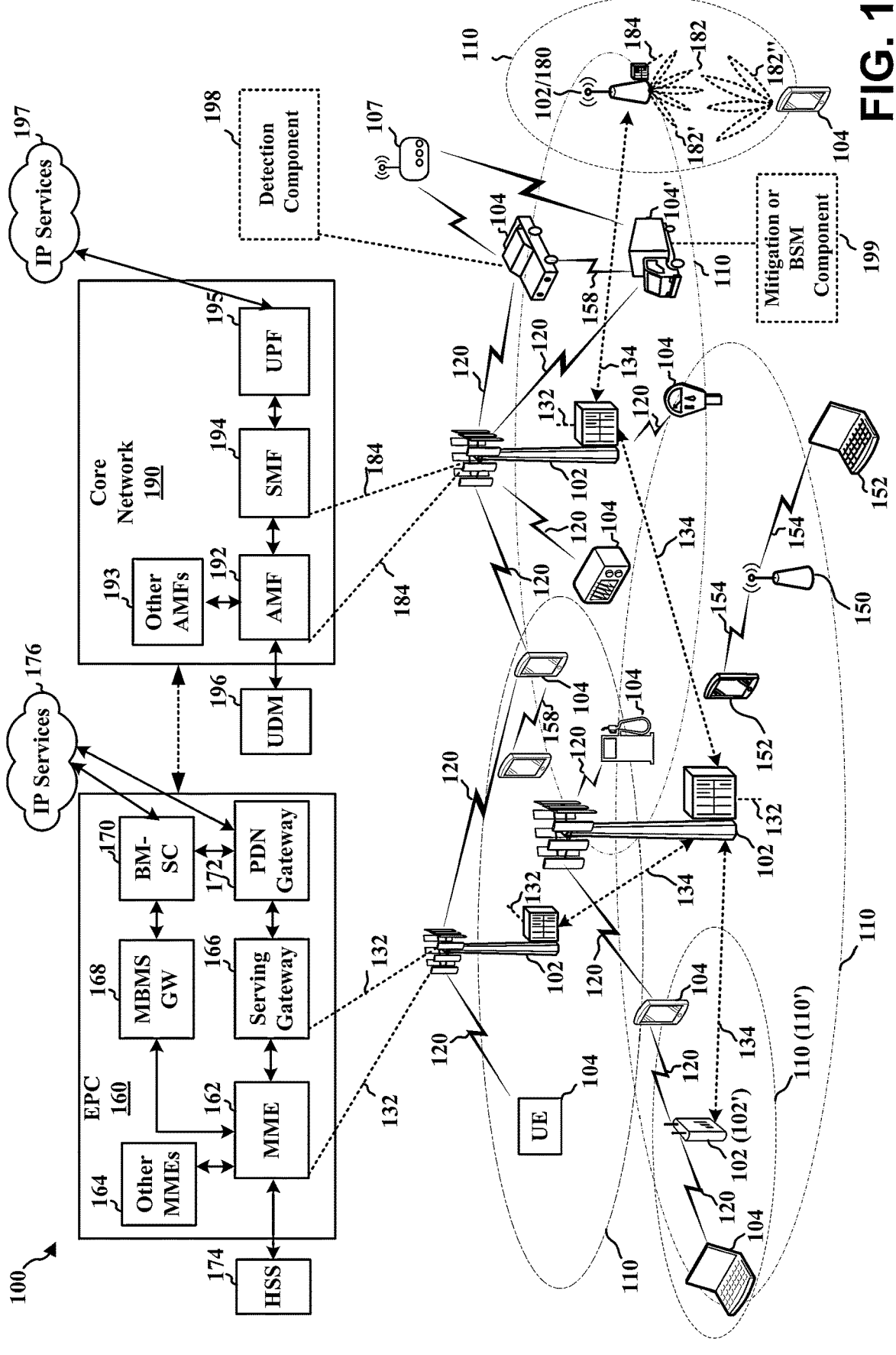
FIG. 1 is a diagram illustrating an example of a wireless communications system and an access network, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A 5G mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Vehicles are an example of devices or systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), and vehicle-to-pedestrian (V2P) communications, which are all collectively referred to as vehicle-to-everything (V2X) communications. V2X communications is a vehicular communication system that supports the wireless transfer of information from a vehicle to other entities (e.g., other vehicles, pedestrians with smart phones, and/or other traffic infrastructure) located within the traffic system that may affect the vehicle. The main purpose of the V2X technology is to improve road safety, fuel savings, and traffic efficiency.

In a V2X communication system, information is transmitted from vehicle sensors (and other sources) through wireless links to allow the information to be communicated to other vehicles, pedestrians, and/or traffic infrastructure. By sharing this information with other vehicles, the V2X technology improves vehicle (and driver) awareness of potential dangers to help reduce collisions with other vehicles and entities. In addition, the V2X technology enhances traffic efficiency by providing traffic warnings to vehicles of potential upcoming road dangers and obstacles such that vehicles may choose alternative traffic routes.

As previously mentioned, the V2X technology includes V2V communications, which can also be referred to as peer-to-peer communications. V2V communications allows for vehicles to directly wireless communicate with each other while on the road. With V2V communications, vehicles can gain situational awareness by receiving information regarding upcoming road dangers (e.g., unforeseen oncoming vehicles, accidents, and road conditions) from the other vehicles.

Systems and techniques described herein provide for vehicle situational awareness of upcoming road dangers (e.g., unforeseen oncoming vehicles, accidents, and road conditions) using V2X technology. The systems and techniques provide the ability of vehicles to be become aware of unforeseen potential road dangers that are not within their field of view, for example, due to obstructions (e.g., obstructing vehicles, structures, and/or objects) in their view. As such, the systems and techniques provide a "see through" capability to vehicles (e.g., in essence to "see through" obstructions by becoming aware of obstructed road dangers).

The disclosed systems and techniques employ the use of a network entity to send advisory messages to vehicles or other network-enabled or network-equipped devices (also referred to as equipped devices) to warn of upcoming potential objects (e.g., road dangers, pedestrians, bicyclists, other vehicles, etc.). In one or more examples, the network entity may collect sensor data obtained from one or more devices, such as nearby vehicles and other network-equipped (e.g., V2X enabled) entities (e.g., user equipment (UE), road side unit (RSU), traffic infrastructure with network communication capabilities, etc.). In some cases, the sensor data may be included in one or more sensing reports. In some examples, the sensor data includes sensing measurements (e.g., radar or radar and light detection and ranging (LIDAR) measurements) associated with one or more objects in an environment, information associated with the one or more devices providing the sensor data, environmental information (e.g., information associated with the environment in which the one or more devices are located), and/or other information.

In some aspects, the network entity may generate the advisory messages by analyzing the sensor data (e.g., from the sensing reports) to obtain an understanding of potential unforeseen dangers for the vehicles and/or equipped devices. In some aspects, an infrastructure-to-vehicle (I2V) interface or a universal mobile telecommunications system (UMTS) air interface (Uu) can be utilized as the air interface for communications between the network entity and the vehicles and/or equipped devices. In some examples, a 5G multi-access edge computing (MEC) device may be employed as the network entity.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more frequencies (e.g., carriers or subcarriers). The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi or WLAN access point (AP) 150 in communication with Wi-Fi or WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as an RSU), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as RSU 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Figure 2:
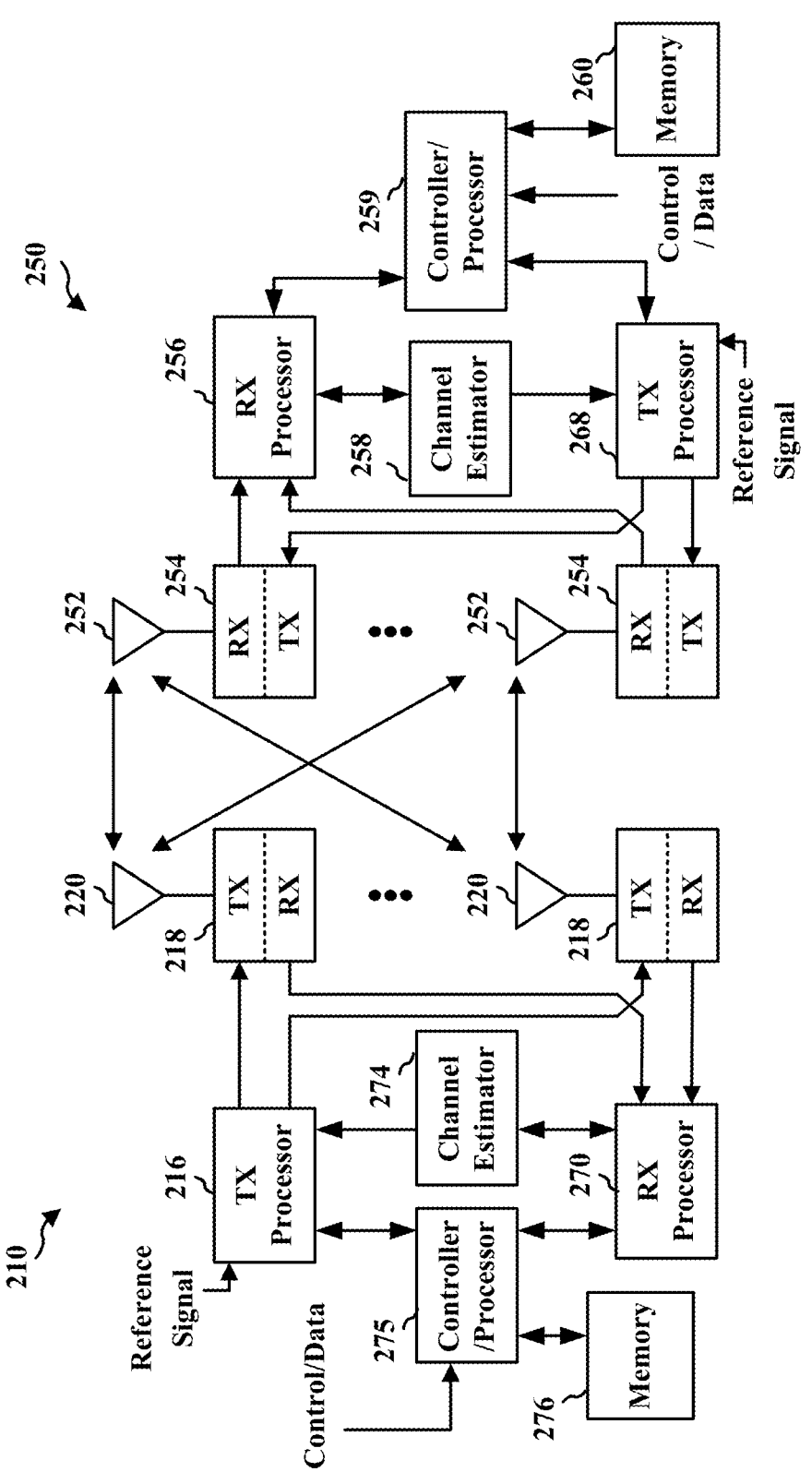
FIG. 2 is a diagram illustrating an example of a first device and a second device involved in wireless communications (e.g., V2V communications, V2X communications, and/or other device-to-device communication), in accordance with some aspects of the present disclosure.

FIG. 2 is a block diagram 200 of a first wireless communication device 210 in communication with a second wireless communication device 250, e.g., via V2V/V2X/other communication. The device 210 may comprise a transmitting device communicating with a receiving device, e.g., device 250. The communication may be based, e.g., on sidelink. The transmitting device 210 may comprise a UE, an RSU, etc. The receiving device may comprise a UE, an RSU, etc. Packets may be provided to a controller/processor 275 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the device 250. Each spatial stream may then be provided to a different antenna 220 via a separate transmitter 218TX. Each transmitter 218TX may modulate an RF carrier with a respective spatial stream for transmission.

At the device 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the device 250. If multiple spatial streams are destined for the device 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 210. These soft decisions may be based on channel estimates computed by the channel estimator 258. The soft decisions are then decoded and deinterleaved to recover the data and control signals that were originally transmitted by device 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. The controller/processor 259 may provide demultiplexing between transport and logical channels, packet reassembly, deciphering, header decompression, and control signal processing. The controller/processor 259 is also responsible for error detection using an ACK and/or NACK protocol to support HARQ operations.

Similar to the functionality described in connection with the transmission by device 210, the controller/processor 259 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by device 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The transmission is processed at the device 210 in a manner similar to that described in connection with the receiver function at the device 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. The controller/processor 275 provides demultiplexing between transport and logical channels, packet reassembly, deciphering, header decompression, control signal processing. The controller/processor 275 is also responsible for error detection using an ACK and/or NACK protocol to support HARQ operations.

At least one of the TX processor 268, the RX processor 256, or the controller/processor 259 of device 250 or the TX 216, the RX processor 270, or the controller/processor 275 may be configured to perform aspects described in connection with 298 or 299 of FIG. 1.

Figure 3:
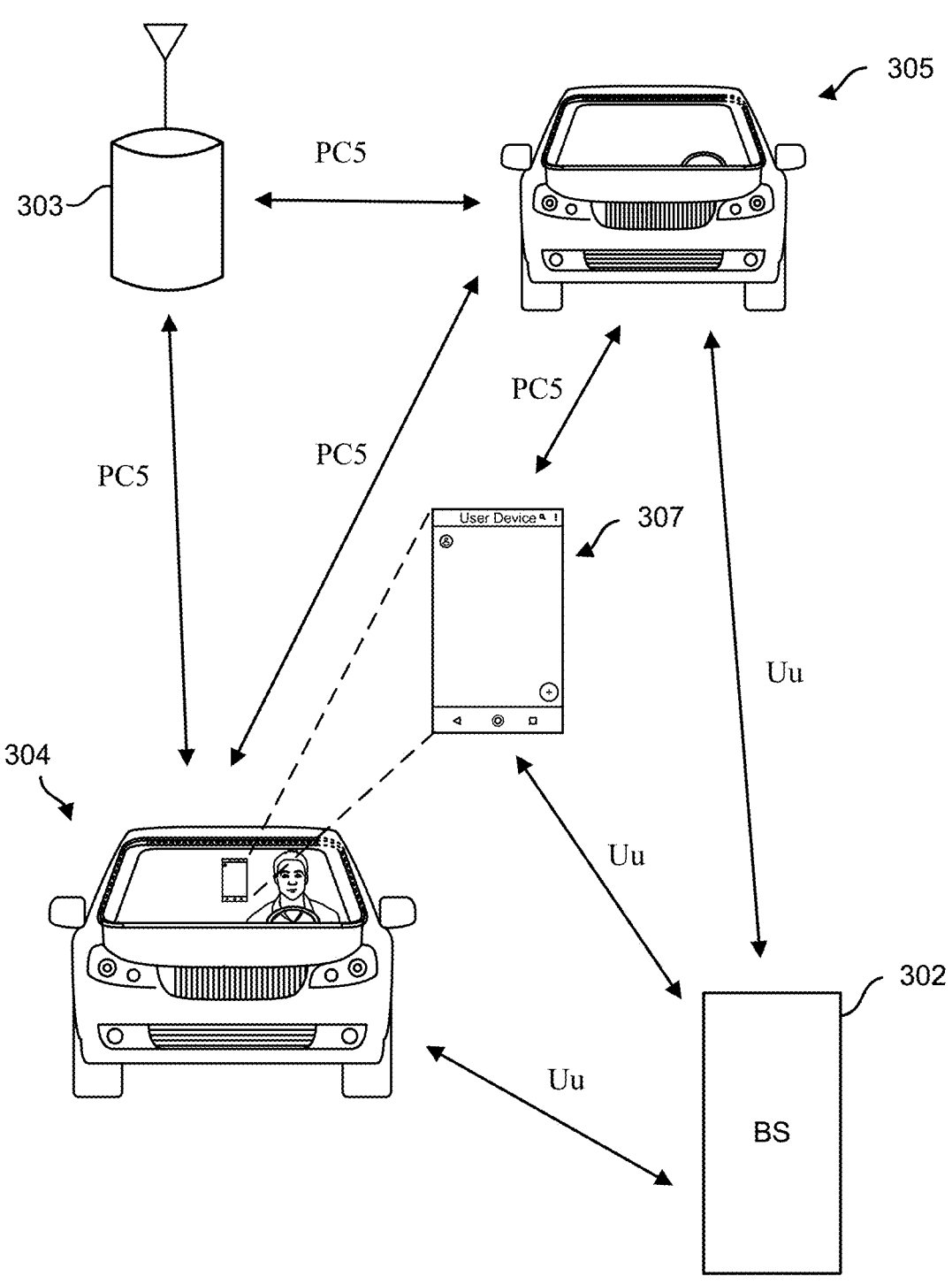
FIG. 3 is a diagram illustrating an example of various user equipment (UEs) communicating over direct communication interfaces (e.g., a cellular based PC5 sidelink interface, 802.11p defined Dedicated Short Range Communication (DSRC) interface, or other direct interface) and wide area network (Uu) interfaces, in accordance with some aspects of the present disclosure.

FIG. 3 illustrates examples of different communication mechanisms used by various UEs. In one example of sidelink communications, FIG. 3 illustrates a vehicle 304, a vehicle 305, and an RSU 303 communicating with each other using PC5, DSRC, or other device to device direct signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 communicating with the base station 302 using a network (Uu) interface. As described below, functionalities can be transferred from a vehicle (e.g., vehicle 304) to a user device (e.g., user device 307) based on one or more characteristics or factors (e.g., temperature, humidity, etc.). In one illustrative example, V2X functionality can be transitioned from the vehicle 304 to the user device 307, after which the user device 307 can communicate with other vehicles (e.g., vehicle 305) over a PC5 interface (or other device to device direct interface, such as a DSRC interface), as shown in FIG. 3.

While FIG. 3 illustrates a particular number of vehicles (e.g., two vehicles 304 and 305) communicating with each other and/or with RSU 303, BS 302, and/or user device 307, the present disclosure is not limited thereto. For instance, tens or hundreds of such vehicles may be communicating with one another and/or with RSU 303, BS 302, and/or user device 307. At any given point in time, each such vehicle, RSU 303, BS 302, and/or user device 307 may transmit various types of information as messages to other nearby vehicles resulting in each vehicle (e.g., vehicles 304 and/or 305), RSU 303, BS 302, and/or user device 307 receiving hundreds or thousands of messages from other nearby vehicles, RSUs, base stations, and/or other UEs per second.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
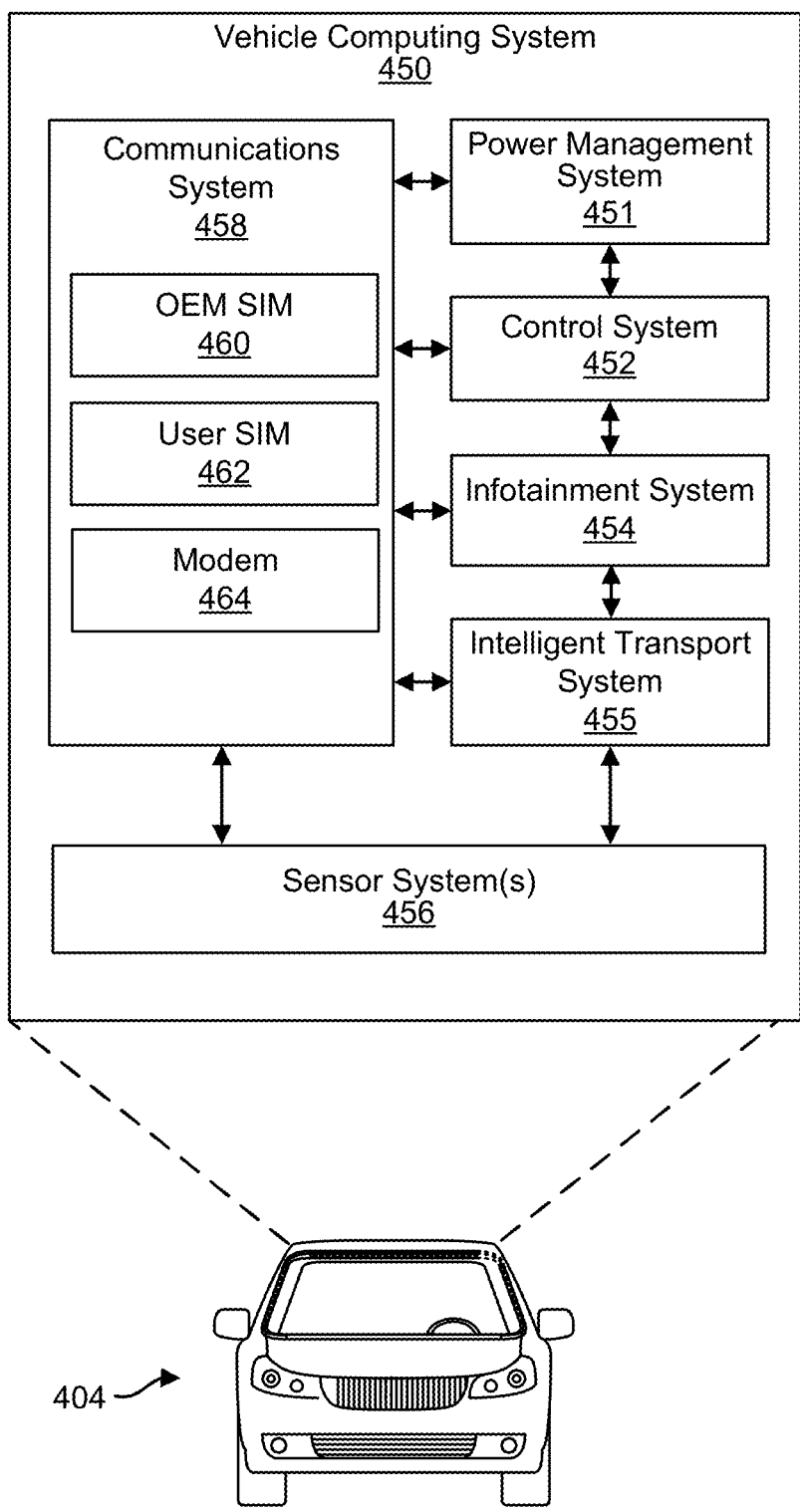
FIG. 4 is a block diagram illustrating an example of a computing system of a vehicle, in accordance with some aspects of the present disclosure.

FIG. 4 is a block diagram illustrating an example a vehicle computing system 450 of a vehicle 404. The vehicle 404 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 450 can include at least a power management system 451, a control system 452, an infotainment system 454, an intelligent transport system (ITS) 455, one or more sensor systems 456, and a communications system 458. In some cases, the vehicle computing system 450 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 can be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 can include one or more electronic control units (ECUs). An ECU can control one or more of the electrical systems or subsystems in a vehicle. Examples of specific ECUs that can be included as part of the control system 452 include an engine control module (ECM), a powertrain control module (PCM), a transmission control module (TCM), a brake control module (BCM), a central control module (CCM), a central timing module (CTM), among others. In some cases, the control system 452 can receive sensor signals from the one or more sensor systems 456 and can communicate with other systems of the vehicle computing system 450 to operate the vehicle 404.

The vehicle computing system 450 also includes a power management system 451. In some implementations, the power management system 451 can include a power management integrated circuit (PMIC), a standby battery, and/or other components. In some cases, other systems of the vehicle computing system 450 can include one or more PMICs, batteries, and/or other components. The power management system 451 can perform power management functions for the vehicle 404, such as managing a power supply for the computing system 450 and/or other parts of the vehicle. For example, the power management system 451 can provide a stable power supply in view of power fluctuations, such as based on starting an engine of the vehicle. In another example, the power management system 451 can perform thermal monitoring operations, such as by checking ambient and/or transistor junction temperatures. In another example, the power management system 451 can perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 460 can be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 can be used by the communications system 458 for performing wireless network access functions in order to support a user data connection (e.g., for conducting phone calls, messaging, Infotainment related services, among others). In some cases, a user device of a user can connect with the vehicle computing system 450 over an interface (e.g., over PC5, Bluetooth™, WiFI (e.g., DSRC), a universal serial bus (USB) port, and/or other wireless or wired interface). Once connected, the user device can transfer wireless network access functionality from the user device to communications system 458 the vehicle, in which case the user device can cease performance of the wireless network access functionality (e.g., during the period in which the communications system 458 is performing the wireless access functionality). The communications system 458 can begin interacting with a base station to perform one or more wireless communication operations, such as facilitating a phone call, transmitting and/or receiving data (e.g., messaging, video, audio, etc.), among other operations. In such cases, other components of the vehicle computing system 450 can be used to output data received by the communications system 458. For example, the infotainment system 454 (described below) can display video received by the communications system 458 on one or more displays and/or can output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) can be used for communication of data for the OEM SIM 460 and/or the user SIM 462. In some examples, the modem 464 can include a 4G (or LTE) modem and another modem (not shown) of the communications system 458 can include a 5G (or NR) modem. In some examples, the communications system 458 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) can be used for performing V2X communications (e.g., with other vehicles for V2V communications, with other devices for D2D communications, with infrastructure systems for V2I communications, with pedestrian UEs for V2P communications, etc.). In some examples, the communications system 458 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 458 can be or can include a telematics control unit (TCU). In some implementations, the TCU can include a network access device (NAD) (also referred to in some cases as a network control unit or NCU). The NAD can include the modem 464, any other modem not shown in FIG. 4, the OEM SIM 460, the user SIM 462, and/or other components used for wireless communications. In some examples, the communications system 458 can include a Global Navigation Satellite System (GNSS). In some cases, the GNSS can be part of the one or more sensor systems 456, as described below. The GNSS can provide the ability for the vehicle computing system 450 to perform one or more location services, navigation services, and/or other services that can utilize GNSS functionality.

In some cases, the communications system 458 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 404 to communicate with a network and/or other UEs.

The vehicle computing system 450 can also include an infotainment system 454 that can control content and one or more output devices of the vehicle 404 that can be used to output the content. The infotainment system 454 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 can include the intelligent transport system (ITS) 455. In some examples, the ITS 455 can be used for implementing V2X communications. For example, an ITS stack of the ITS 455 can generate V2X messages based on information from an application layer of the ITS. In some cases, the application layer can determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 can obtain car access network (CAN) information (e.g., from other components of the vehicle via a CAN bus). In some examples, the communications system 458 (e.g., a TCU NAD) can obtain the CAN information via the CAN bus and can send the CAN information to a PHY/MAC layer of the ITS 455. The ITS 455 can provide the CAN information to the ITS stack of the ITS 455. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 455.

The conditions used to determine whether to generate messages can be determined using the CAN information based on safety-related applications and/or other applications, including applications related to road safety, traffic efficiency, infotainment, business, and/or other applications. In one illustrative example, the ITS 455 can perform lane change assistance or negotiation. For instance, using the CAN information, the ITS 455 can determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 can determine a lane-change condition has been met that is associated with a message to be sent to other vehicles that are nearby the vehicle in the adjacent lane. The ITS 455 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 can use any suitable protocol to generate messages (e.g., V2X messages). Examples of protocols that can be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 455 can be signed by the security layer of the ITS 455. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message can be received by the communications system 458 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 452, which can cause the control system 452 to automatically break the vehicle 404 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 455 can receive a large number of messages from the other UEs (e.g., vehicles, RSUs, etc.), in which case the ITS 455 will authenticate (e.g., decode and decrypt) each of the messages and/or determine which operations to perform. Such a large number of messages can lead to a large computational load for the vehicle computing system 450. In some cases, the large computational load can cause a temperature of the computing system 450 to increase. Rising temperatures of the components of the computing system 450 can adversely affect the ability of the computing system 450 to process the large number of incoming messages. One or more functionalities can be transitioned from the vehicle 404 to another device (e.g., a user device, a RSU, etc.) based on a temperature of the vehicle computing system 450 (or component thereof) exceeding or approaching one or more thermal levels. Transitioning the one or more functionalities can reduce the computational load on the vehicle 404, helping to reduce the temperature of the components. A thermal load balancer can be provided that enable the vehicle computing system 450 to perform thermal based load balancing to control a processing load depending on the temperature of the computing system 450 and processing capacity of the vehicle computing system 450.

The computing system 450 further includes one or more sensor systems 456 (e.g., a first sensor system through an Nth sensor system, where N is a value equal to or greater than 0). When including multiple sensor systems, the sensor system(s) 456 can include different types of sensor systems that can be arranged on or in different parts the vehicle 404. The sensor system(s) 456 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 450 of the vehicle 404.

While the vehicle computing system 450 is shown to include certain components and/or systems, one of ordinary skill will appreciate that the vehicle computing system 450 can include more or fewer components than those shown in FIG. 4. For example, the vehicle computing system 450 can also include one or more input devices and one or more output devices (not shown). In some implementations, the vehicle computing system 450 can also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 5:
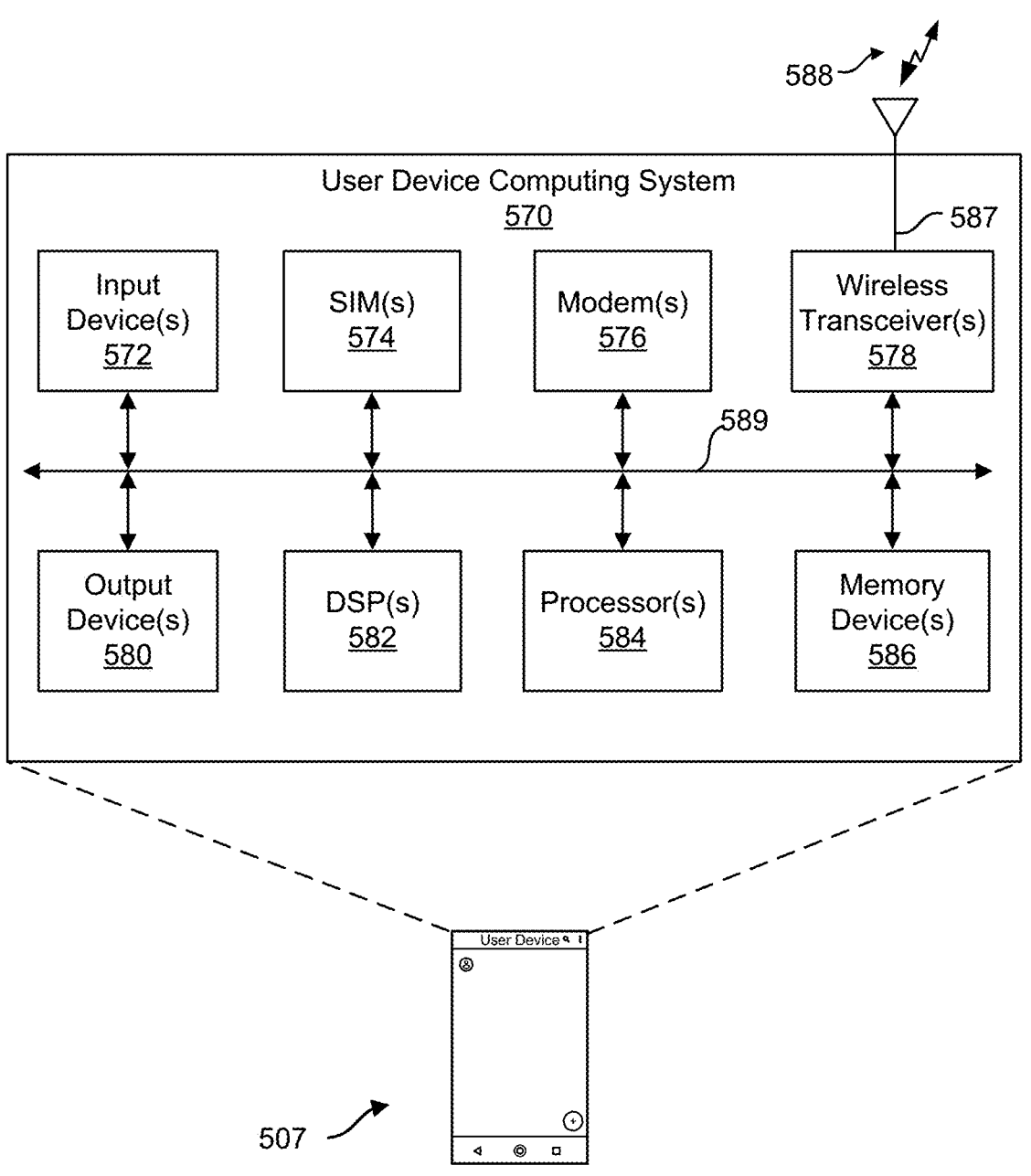
FIG. 5 is a block diagram illustrating an example of a computing system of a user device, in accordance with some aspects of the present disclosure.

FIG. 5 illustrates an example of a computing system 570 of a user device 507. The user device 507 is an example of a UE that can be used by an end-user. For example, the user device 507 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 570 includes software and hardware components that can be electrically or communicatively coupled via a bus 589 (or may otherwise be in communication, as appropriate). For example, the computing system 570 includes one or more processors 584. The one or more processors 584 can include one or more CPUs, ASICs, FPGAs, APs, GPUs, VPUs, NSPs, microcontrollers, dedicated hardware, any combination thereof, and/or other processing device or system. The bus 589 can be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

The one or more wireless transceivers 578 can receive wireless signals (e.g., signal 588) via antenna 587 from one or more other devices, such as other user devices, vehicles (e.g., vehicle 404 of FIG. 4 described above), network devices (e.g., base stations such as eNBs and/or gNBs, WiFI routers, etc.), cloud networks, and/or the like. In some examples, the computing system 570 can include multiple antennae. The wireless signal 588 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 588 into a baseband or intermediate frequency and can convert the RF signals to the digital domain.

In some cases, the computing system 570 can include a coding-decoding device (or CODEC) configured to encode and/or decode data transmitted and/or received using the one or more wireless transceivers 578. In some cases, the computing system 570 can include an encryption-decryption device or component configured to encrypt and/or decrypt data (e.g., according to the AES and/or DES standard) transmitted and/or received by the one or more wireless transceivers 578.

The one or more SIMs 574 can each securely store an IMSI number and related key assigned to the user of the user device 507. As noted above, the IMSI and key can be used to identify and authenticate the subscriber when accessing a network provided by a network service provider or operator associated with the one or more SIMs 574. The one or more modems 576 can modulate one or more signals to encode information for transmission using the one or more wireless transceivers 578. The one or more modems 576 can also demodulate signals received by the one or more wireless transceivers 578 in order to decode the transmitted information. In some examples, the one or more modems 576 can include a 4G (or LTE) modem, a 5G (or NR) modem, a modem configured for V2X communications, and/or other types of modems. The one or more modems 576 and the one or more wireless transceivers 578 can be used for communicating data for the one or more SIMs 574.

The computing system 570 can also include (and/or be in communication with) one or more non-transitory machine-readable storage media or storage devices (e.g., one or more memory devices 586), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 586 and executed by the one or more processor(s) 584 and/or the one or more DSPs 582. The computing system 570 can also include software elements (e.g., located within the one or more memory devices 586), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 6:
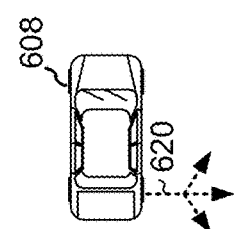
FIG. 6 is a diagram illustrating an example of devices involved in wireless communications (e.g., sidelink communications), in accordance with some aspects of the present disclosure.

FIG. 6 illustrates an example 600 of wireless communication between devices based on sidelink communication, such as V2X or other D2D communication. The communication may be, for example, based on a slot structure. For example, transmitting UE 602 may transmit a transmission 614, e.g., comprising a control channel and/or a corresponding data channel, that may be received by receiving UEs 604, 606, 608. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 602, 604, 606, 608 may each be capable of operating as a transmitting device in addition to operating as a receiving device. Thus, UEs 606, 608 are illustrated as transmitting transmissions 616, 620. The transmissions 614, 616, 620 (and 618 by RSU 607) may be broadcast or multicast to nearby devices. For example, UE 614 may transmit communication intended for receipt by other UEs within a range 601 of UE 614. Additionally/ alternatively, RSU 607 may receive communication from and/or transmit communication 618 to UEs 602, 604, 606, 608.

Figures 7A, 7B, 7C, 7D:
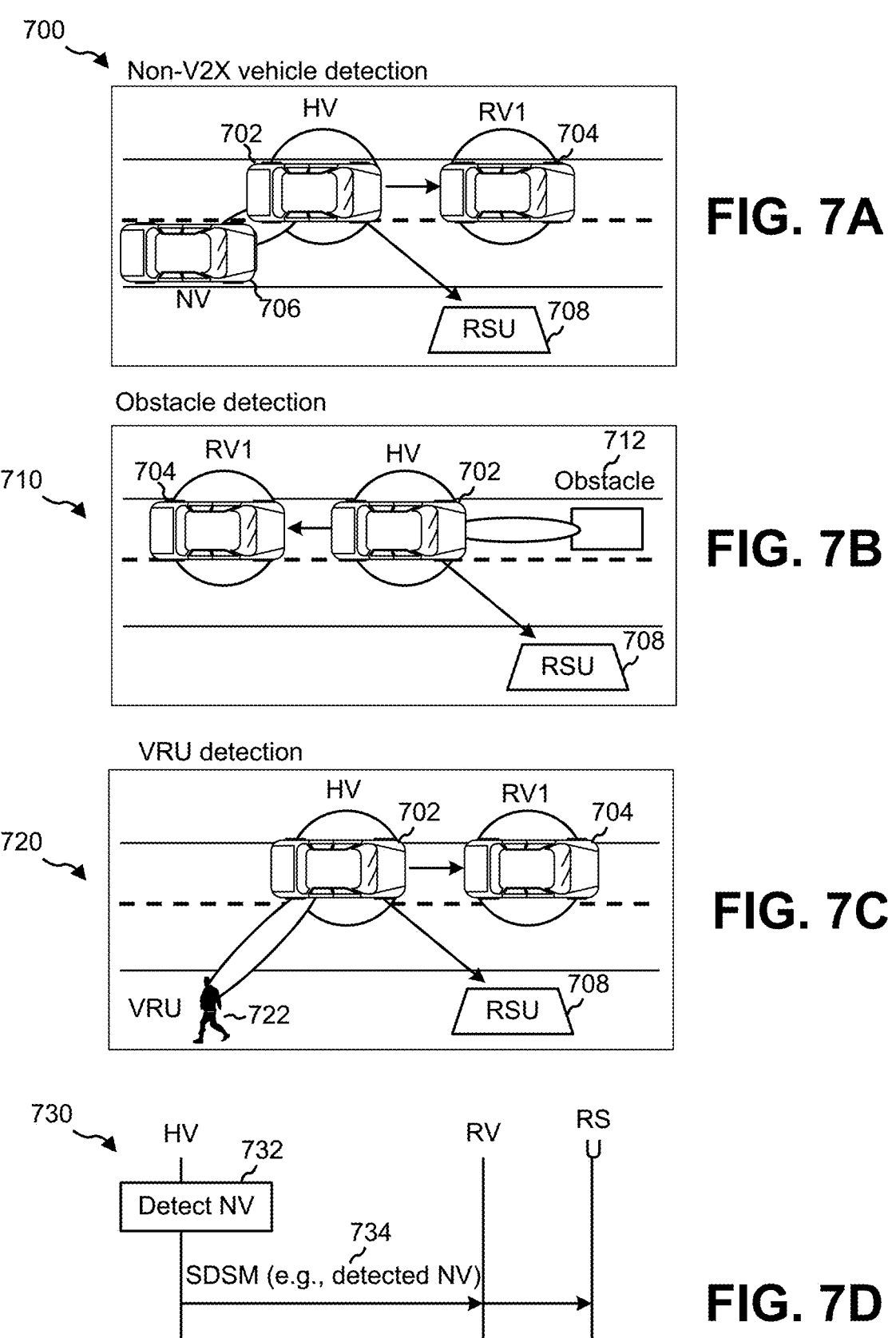
FIGS. 7A-7D are diagrams illustrating examples of sensor-sharing for cooperative and automated driving systems, in accordance with some aspects of the present disclosure.
Figure 8:
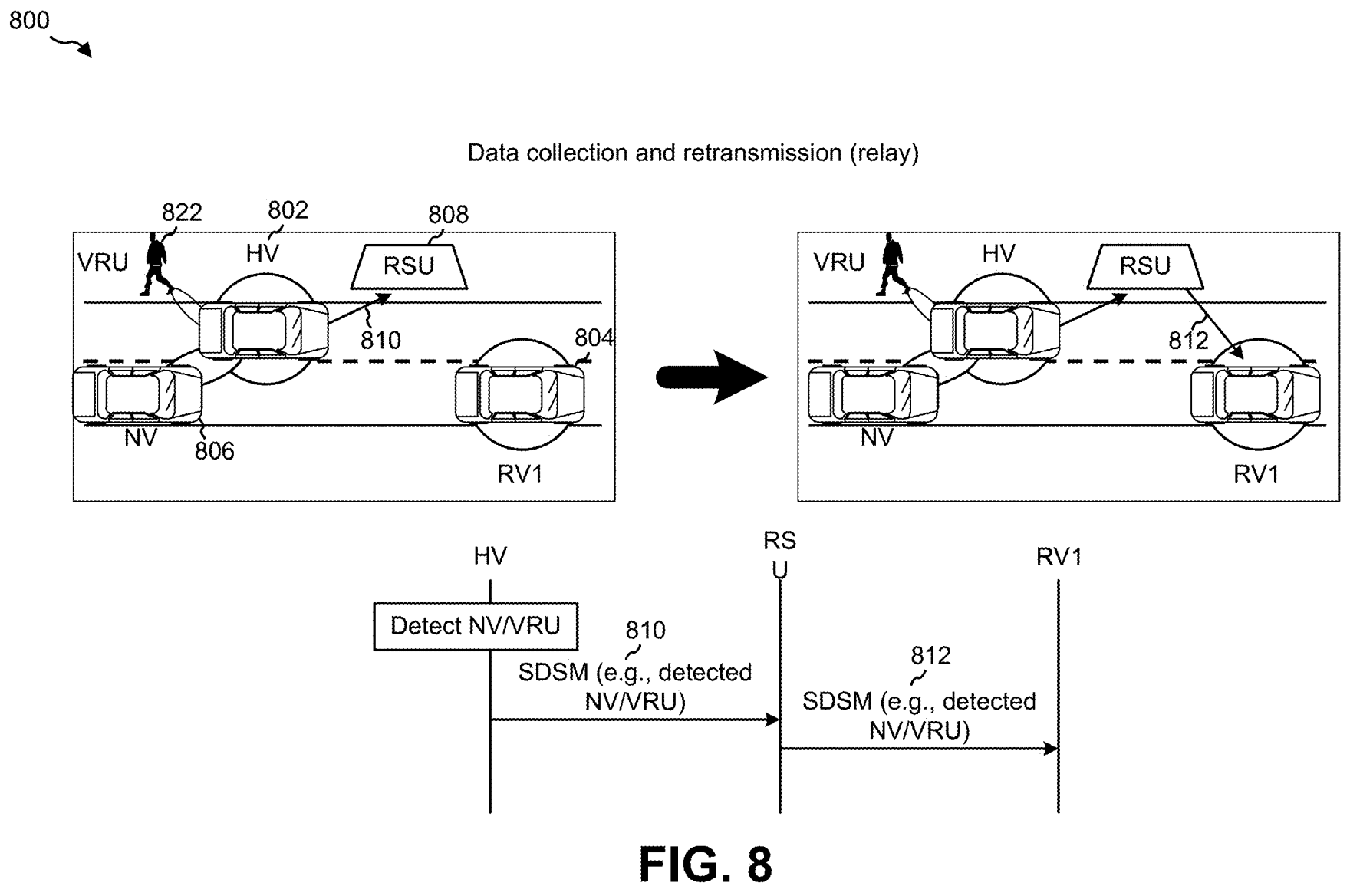

In wireless communications, such as V2X communications, V2X entities may perform sensor sharing with other V2X entities for cooperative and automated driving. For example, with reference to diagram 700 of FIG. 7A, the host vehicle (HV) 702 may detect a number of items within its environment. For example, the HV 702 may detect the presence of the non-V2X entity (NV) 706 at block 732. The HV 702 may inform other entities, such as a first remote vehicle (RV1) 704 or a RSU 708, about the presence of the NV 706, if the RV1 704 and/or the RSU 708, by themselves, are unable to detect the NV 706. The HV 702 informing the RV1 704 and/or the RSU 708 about the NV 706 is a sharing of sensor information. With reference to diagram 710 of FIG. 7B, the HV 702 may detect a physical obstacle 712, such as a pothole, debris, or an object that may be an obstruction in the path of the HV 702 and/or RV1 704 that has not yet been detected by RV1 704 and/or RSU 708. The HV 702 may inform the RV1 and/or the RSU 708 of the obstacle 712, such that the obstacle 712 may be avoided. With reference to diagram 720 of FIG. 7C, the HV 702 may detect the presence of a vulnerable road user (VRU) 722 and may share the detection of the VRU 722 with the RV1 704 and the RSU 708, in instances where the RSU 708 and/or RV1 704 may not be able to detect the VRU 722. With reference to diagram 730 of FIG. 7D, the HV, upon detection of a nearby entity (e.g., NV, VRU, obstacle) may transmit a sensor data sharing message (SDSM) 734 to the RV and/or the RSU to share the detection of the entity. The SDSM 734 may be a broadcast message such that any receiving device within the vicinity of the HV may receive the message. In some instances, the shared information may be relayed to other entities, such as RVs. For example, with reference to diagram 800 of FIG. 8, the HV 802 may detect the presence of the NV 806 and/or the VRU 822. The HV 802 may broadcast the SDSM 810 to the RSU 808 to report the detection of NV 806 and/or VRU 822. The RSU 808 may relay the SDSM 810 received from the HV 802 to remote vehicles such that the remote vehicles are aware of the presence of the NV 806 and/or VRU 822. For example, the RSU 808 may transmit an SDSM 812 to the RV1 804, where the SDSM 812 includes information related to the detection of NV 806 and/or VRU 822.

Figure 9:
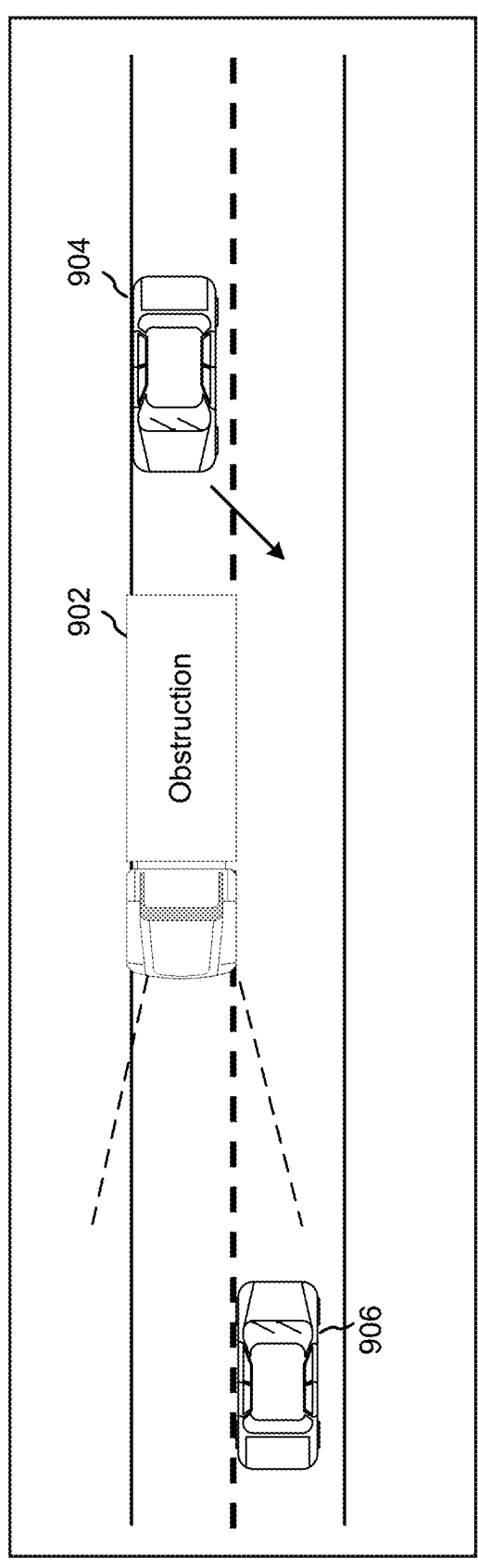
FIG. 9 is a diagram illustrating an example of a vehicle configuration, which has an obstructing vehicle, in accordance with some aspects of the present disclosure.

FIG. 9 is a diagram illustrating an example of a vehicle configuration 900, which has an obstructing vehicle 902, in accordance with some aspects of the present disclosure. The vehicle configuration 900 in FIG. 9 depicts an example of a "see through use case." In particular, in FIG. 9, a vehicle 904 is shown to be driving behind the obstructing vehicle (e.g., a truck) 902. The vehicle 904 (or driver of the vehicle) desires to pass (overtake) the obstructing vehicle 902. However, the obstructing vehicle 902 is obstructing a field of view (FOV) of the vehicle 904 and, as such, vehicle 904 is not aware of oncoming vehicle 906 located in the opposite lane and driving in the opposite direction of vehicle 904, because vehicle 904 is not able to see (or sense) the oncoming vehicle 906 through the obstructing vehicle 902. It should be noted that, in general, a "see through use case" is directed to vehicle configurations where at least one obstruction (e.g., an obstructing vehicle, such as obstructing vehicle 902, or other obstructing structure or object) is blocking a vehicle's FOV regarding at least one upcoming road danger. As used herein, a FOV of a vehicle refers to a respective FOV of one or more sensors (e.g., cameras, radar, LIDAR, any combination thereof, and/or other sensors) of the vehicle. Further, reference herein to a vehicle "seeing" or not "seeing" another object, such as another vehicle, pedestrian, etc., refers to whether the other object is within a FOV of a sensor or multiple sensors of the vehicle. It should be noted that "see through use cases" are not limited to overtaking situations, as are shown in FIGS. 9 and 10.

Figure 10:
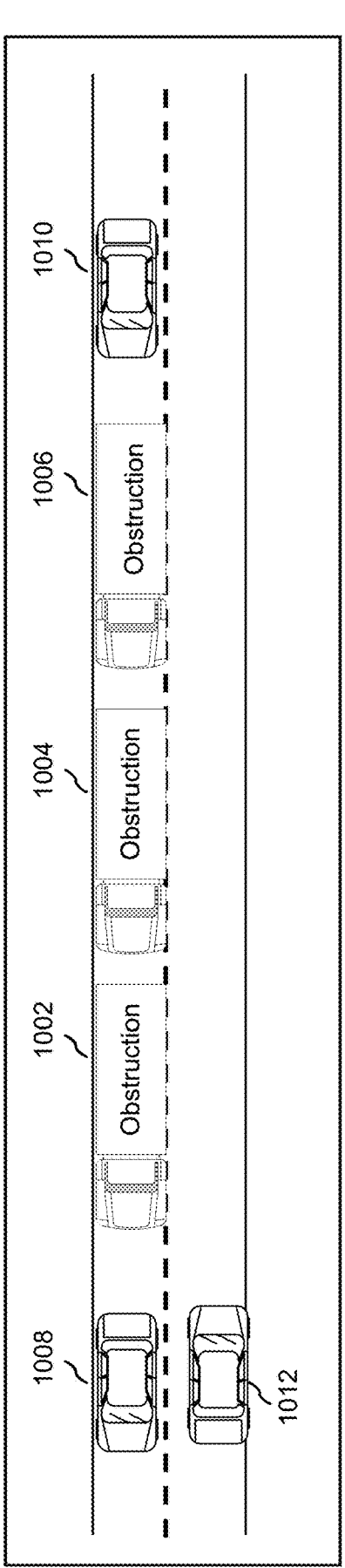
FIG. 10 is a diagram illustrating an example of a vehicle configuration, which has multiple obstructing vehicles, in accordance with some aspects of the present disclosure.

FIG. 10 is a diagram illustrating an example of a vehicle configuration 1000, which has multiple obstructing vehicles 1002, 1004, 1006, in accordance with some aspects of the present disclosure. The vehicle configuration 1000 in FIG. 10 depicts another example of a "see through use case." In particular, in FIG. 10, a vehicle 1010 (e.g., an automobile) is shown to be driving behind three obstructing vehicles (e.g., trucks) 1002, 1004, 1006 as well as vehicle (e.g., an automobile) 1008. The vehicle 1010 desires to pass or overtake the obstructing vehicle 1002. However, the obstructing vehicles 1002, 1004, 1006 are obstructing the vehicle's 1010 FOV (e.g., a respective FOV of one or more sensors of the vehicle 1010) with regard to obstructing vehicles 1004, 1006 and vehicles 1008, 1012. Since vehicle 1010 is not able to see (or sense) the oncoming vehicle 1012 through the obstructing vehicles 1006, 1004, 1002, the vehicle 1010 is not aware of oncoming vehicle 1012 located in the opposite lane and driving in the opposite direction of vehicle 1010. The vehicle 1010 is also not able to see (or sense) obstructing vehicles 1004, 1002 and vehicle 1008 through the obstructing vehicle 1006 and, as such, the vehicle 1010 is not aware of obstructing vehicles 1002, 1004 or vehicle 1008. As such, it is evident that the ability to "see through" an obstructing vehicle(s) (e.g., obstructing vehicle 902 of FIG. 9, or obstructing vehicles 1002, 1004, 1006 of FIG. 10), structure(s), and/or object(s) will greatly enhance road safety as well as be helpful for cooperative driving. It should be noted that the example vehicle configurations 900, 1000 of "see through use cases" shown in FIGS. 9 and 10 are merely examples and, as such, "see through use cases" may have various different vehicle configurations including more or less vehicles and obstructions (e.g., obstructing vehicles), than as shown in FIGS. 9 and 10.

Figure 11A:
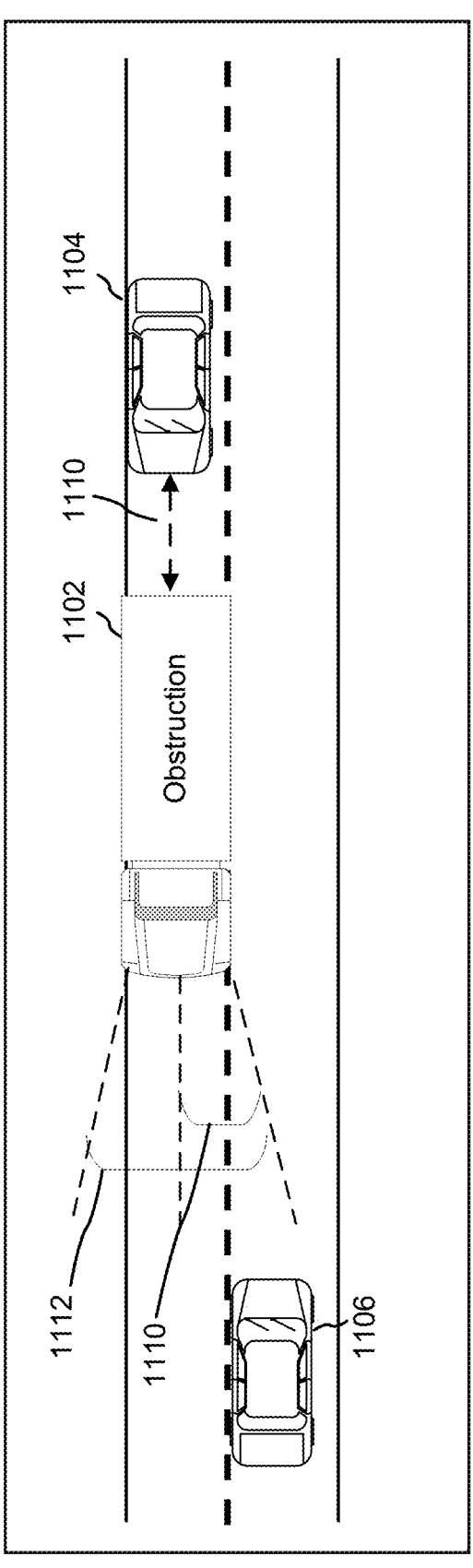
FIG. 11A is a diagram illustrating an example of vehicles sharing sensor data with each other (e.g., using V2V communications).
Figure 11B:
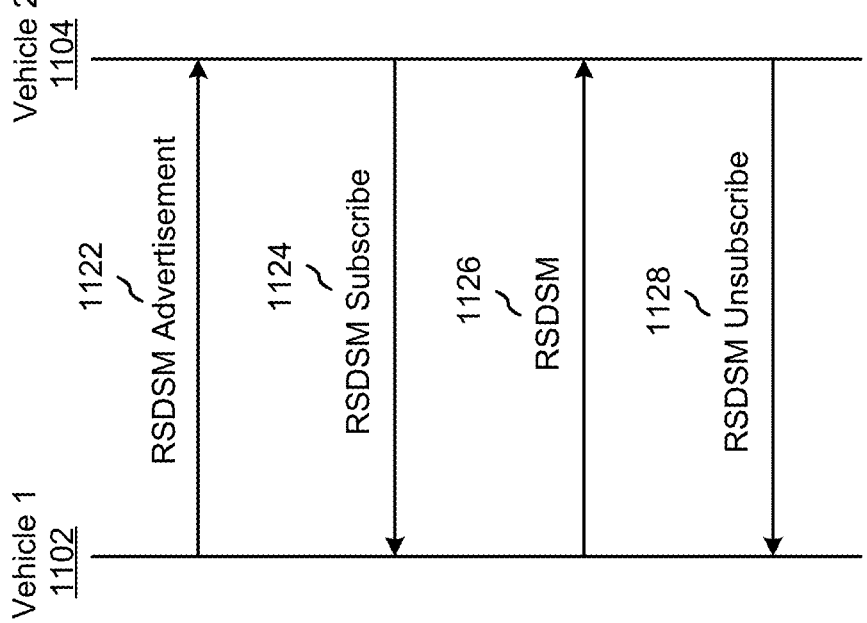
FIG. 11B is a diagram of an example of a communication (e.g., a V2V communications) exchange performed between the vehicles of FIG. 11A for sharing sensor data.

FIG. 11A is a diagram illustrating an example of an environment 1100 including vehicles (e.g., obstructing vehicle 1102 and vehicle 1104) sharing sensor data with each other (e.g., using V2V communications). FIG. 11B is a diagram of an example of a communication (e.g., a V2V communications) exchange 1120 performed between the vehicles (e.g., obstructing vehicle 1102 and vehicle 1104) of FIG. 11A for sharing sensor data. The Society of Automobile Engineers (SAE) standard SAE J3224 for V2X sensing-sharing for cooperative and automated driving defines "sensor sharing" as "the dissemination of information of detected objects by vehicles and RSUs over V2X to other V2X-capable entities." The V2X-capable entities may include, but are not limited to, V2X-equipped vehicles (e.g., automobiles or trucks), V2X-equipped structures (e.g., buildings or traffic structures, such as stop lights), base stations (e.g., eNBs or gNBs), RSUs, and/or V2X-equipped VSUs, which are non-motorized road users (e.g., persons or bicyclists).

The data that may be shared amongst the V2X-capable entities may include raw data (e.g., radar or LIDAR sensing data) or descriptions (and/or information) relating to characteristics (e.g., size, location, and/or motion state) of a detected object(s). The descriptions (and/or information)

related to the characteristics of the detected object(s) may be determined from the raw data. SDSMs may be utilized to share the descriptions (or information) amongst the V2X-capable entities, and raw sensor data sharing messages (RSDSMs) may be utilized to share the raw data amongst the V2X-capable entities. Each SDSM may include one or more detected road users (e.g., vehicles or VSUs) and/or one or more detected road features (e.g., structures, objects, obstacles, or road topology features). The sharing of sensor data (e.g., both descriptions and raw data) amongst the V2X-capable entities can greatly enhance the sensor sharing capabilities of the V2X-capable entities.

SAE J3224 supports sensor sharing for "see through use cases" by implementing a V2V sharing of sensor data. FIG. 11A depicts an example of V2V sharing of sensor data, and FIG. 11B shows an example communication exchange for the V2V sharing of sensor data of FIG. 11A. In particular, in FIG. 11A, a vehicle (e.g., an automobile) 1104 is shown to be driving behind an obstructing vehicle (e.g., a truck) 1102. The vehicle 1104 desires to pass (overtake) the obstructing vehicle 1102. However, the obstructing vehicle 1102 is obstructing the view of the vehicle 1104 such that the vehicle 1104 is not aware of the oncoming vehicle 1106 located in the opposite lane and driving in the opposite direction of vehicle 1104.

The obstructing vehicle (e.g., vehicle 1) 1102 may advertise its ability to share with vehicle (e.g., vehicle 2) 1104 sensor data obtained from the obstructing vehicle's 1102 sensors (e.g., radar sensors and/or LIDAR sensors) within the FOV 1112 of the sensors. The obstructing vehicle 1102 may advertise its ability to share sensor data with vehicle 1104 by sending an RSDSM advertisement (e.g., RSDSM advertisement 1122 of FIG. 11B) to vehicle 1104. It should be noted that the obstructing vehicle 1102 may broadcast to all nearby V2X-capable entities the advertisement of its ability to share sensor data.

In response to receiving the advertisement for the sharing of sensor data, the vehicle 1104 may request to subscribe to the sharing of sensor data from the obstructing vehicle 1102. In addition, along with the request to subscribe, the vehicle 1104 may indicate its region of interest (ROI) (e.g., which may mainly cover the oncoming lane, which is located to the left of the obstructing vehicle 1102) 1110. The vehicle 1104 may request to subscribe (as well as indicate its ROI 1110) by sending an RSDSM subscription request (e.g., RSDSM subscribe 1124 of FIG. 11B) to the obstructing vehicle 1102. It should be noted that if the RSDSM subscription request does not contain the vehicle's 1102 ROI 1110, the obstructing vehicle 1102 will assume that the entire FOV 1112 of its sensors is desired.

Upon receiving the request to subscribe from the vehicle 1104, the obstructing vehicle 1102 will transmit (e.g., via periodical transmissions) sensor data obtained by the obstructing vehicle's 1102 sensors to the vehicle 1104. The obstructing vehicle 1102 may transmit the sensor data by sending an RSDSM (e.g., RSDSM 1126 of FIG. 11B) containing raw sensor data to the vehicle 1104. If the vehicle 1102 indicated, within the request to subscribe, a desired ROI 1110 for the sensor data, the obstructing vehicle 1102 will only transmit sensor data for that ROI 1110. However, if the vehicle 1102 did not indicate a desired ROI 1110, the obstructing vehicle 1102 will transmit sensor data for the entire FOV 1112.

After the vehicle 1104 has obtained an amount of sensor data (e.g., a sufficient amount of sensor data to become aware of oncoming vehicle 1106) from the obstructing vehicle 1102, the vehicle 1104 may decide to unsubscribe to the sharing of sensor data from the obstructing vehicle 1102. The vehicle 1104 may request to unsubscribe by sending an RSDSM unsubscribe request (e.g., RSDSM unsubscribe 1128 of FIG. 11B) to the obstructing vehicle 1102. Once the obstructing vehicle 1102 receives the unsubscribe request from the vehicle 1104, the obstructing vehicle 1102 can stop transmission of the sensor data to the vehicle 1104.

Figure 12:
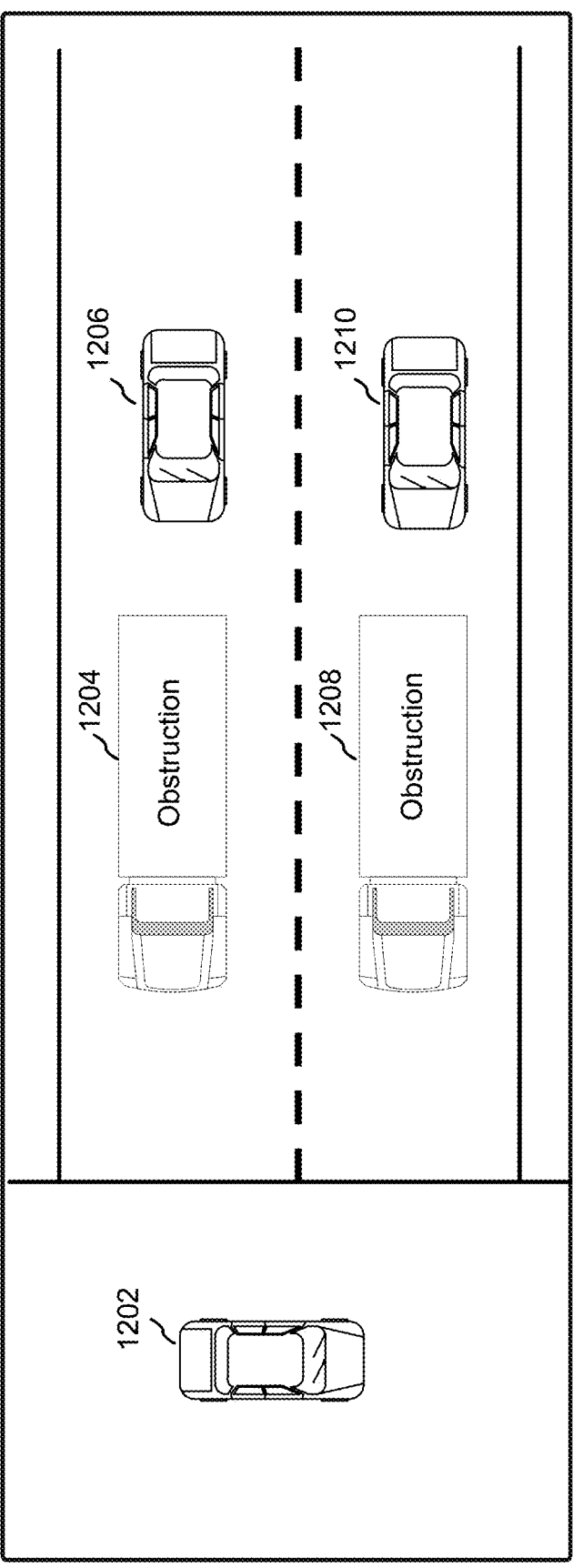
FIG. 12 is a diagram illustrating an example of a vehicle configuration, which has multiple obstructing vehicles, in accordance with some aspects of the present disclosure.

FIG. 12 is a diagram illustrating an example of a vehicle configuration 1200, which has multiple obstructing vehicles 1204, 1208, in accordance with some aspects of the present disclosure. The vehicle configuration 1200 in FIG. 12 depicts another example of a "see through use case," which is not an overtaking situation, as is shown in FIGS. 9 and 10. In particular, in FIG. 12, vehicles (e.g., automobiles) 1206, 1210 are each shown to be driving behind a respective obstructing vehicle (e.g., a truck) 1204, 1208. The obstructing vehicles 1204, 1208 are obstructing the vehicle's 1206, 1210 FOV, respectively, with regard to vehicle (e.g., automobile) 1202, which is driving across an intersection located ahead of the vehicles 1206, 1210. Since the vehicles 1206, 1210 are not able to see (or sense) the vehicle 1202 through the obstructing vehicles 1204, 1208, the vehicles 1206, 1210 are not aware of the vehicle 1202 crossing in the intersection ahead of the vehicles 1206, 1210.

The vehicles 1206, 1210 may request to obtain sensor data (e.g., using V2V communications) from the obstructing vehicles 1204, 1208 in an effort to see (or sense) any object located within the intersection ahead. However, it should be noted that sensor sharing using V2V communications has many have drawbacks, as is evidenced by the vehicle configuration 1200 of FIG. 12. As such, in some instances, using V2V communications for sensor sharing may not provide vehicles 1206, 1210 with sufficient awareness of the vehicle 1202 crossing the intersection.

For example, for sensor sharing using V2V communications, sensor data is transmitted from one V2X-capable entity (e.g., an obstructing vehicle 1204, 1208) to one other V2X-capable entity (e.g., a vehicle 1206, 1210) and, as such, it is a one-to-one communications. Since, in most vehicle configurations, the V2X-capable entities are moving dynamically, the obstructed views of the V2X-capable entities (e.g., vehicles 1206, 1210) are subject to change dynamically.

In addition, while a V2X-capable entity (e.g., obstructing vehicle 1204, 1208) is transmitting sensor data to another V2X-capable entity (e.g., vehicle 1206, 1210), if there is movement of the V2X-capable entities such that the relative positions of the V2X-capable entities change, the V2X-capable entity (e.g., vehicle 1206, 1210) may no longer be capable of receiving sensor data transmissions from the other V2X-capable entity (e.g., obstructing vehicle 1204, 1208) because the V2X-capable entity (e.g., vehicle 1206, 1210) is no longer located within the transmission FOV of the V2X-capable entity (e.g., obstructing vehicle 1204, 1208).

Additionally, as is evidenced in the vehicle configuration 1200 of FIG. 12, sometimes multiple V2X-capable entities (e.g., obstructing vehicles 1204, 1208) are obstructing the view of a V2X-capable entity (e.g., vehicle 1206) regarding a single object (e.g., vehicle 1202). In these situations, the V2X-capable entity (e.g., vehicle 1206) with the obstructed view will need to obtain sensor data from all of the V2X-capable entities (e.g., obstructing vehicles 1204, 1208) that are obstructing the view. This will require the V2X-capable entity (e.g., vehicle 1206) to have to transmit and receive sensor messages (e.g., RSDSMs) to all of the V2X-capable entities (e.g., obstructing vehicles 1204, 1028), which requires much frequency bandwidth. Then, the V2X-capable entity (e.g., vehicle 1206) will have to combine and analyze the sensor data obtained from all of the V2X-capable entities (e.g., obstructing vehicles 1204, 1028), which requires much processing power (which may not even be available), in order to identify the object (e.g., vehicle 1202) ahead. As such, since sensor sharing using V2V communications requires much bandwidth and processing power, sensor sharing using V2V communications is not a scalable solution.

In order to obviate the problems of sensor sharing using V2V communications, which include the changing of the views with the dynamic movement of the devices and the requirement of an excessive amount of bandwidth and processing power, the system of the present disclosure employs a central network entity to orchestrate and manage the sharing of sensor data amongst equipped (e.g., V2X capable) devices. The communications and computation are centralized at a single network entity, thereby providing for efficient use of bandwidth and power as well as supporting ultra-low latency.

Figure 13:
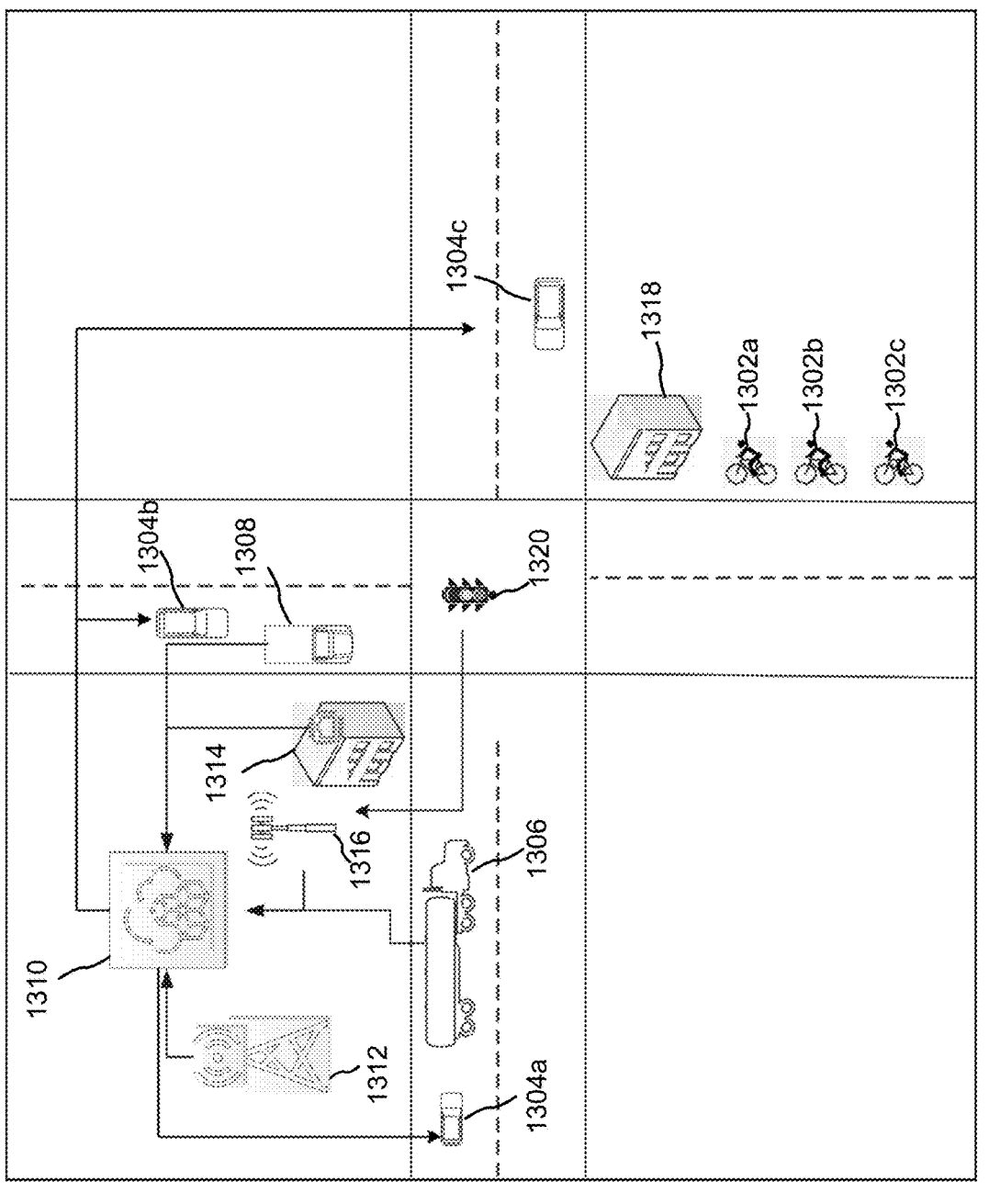
FIG. 13 is a diagram of the disclosed system for providing vehicle situational awareness for an enhanced V2X see-through use case, in accordance with some aspects of the present disclosure.
Figure 14:
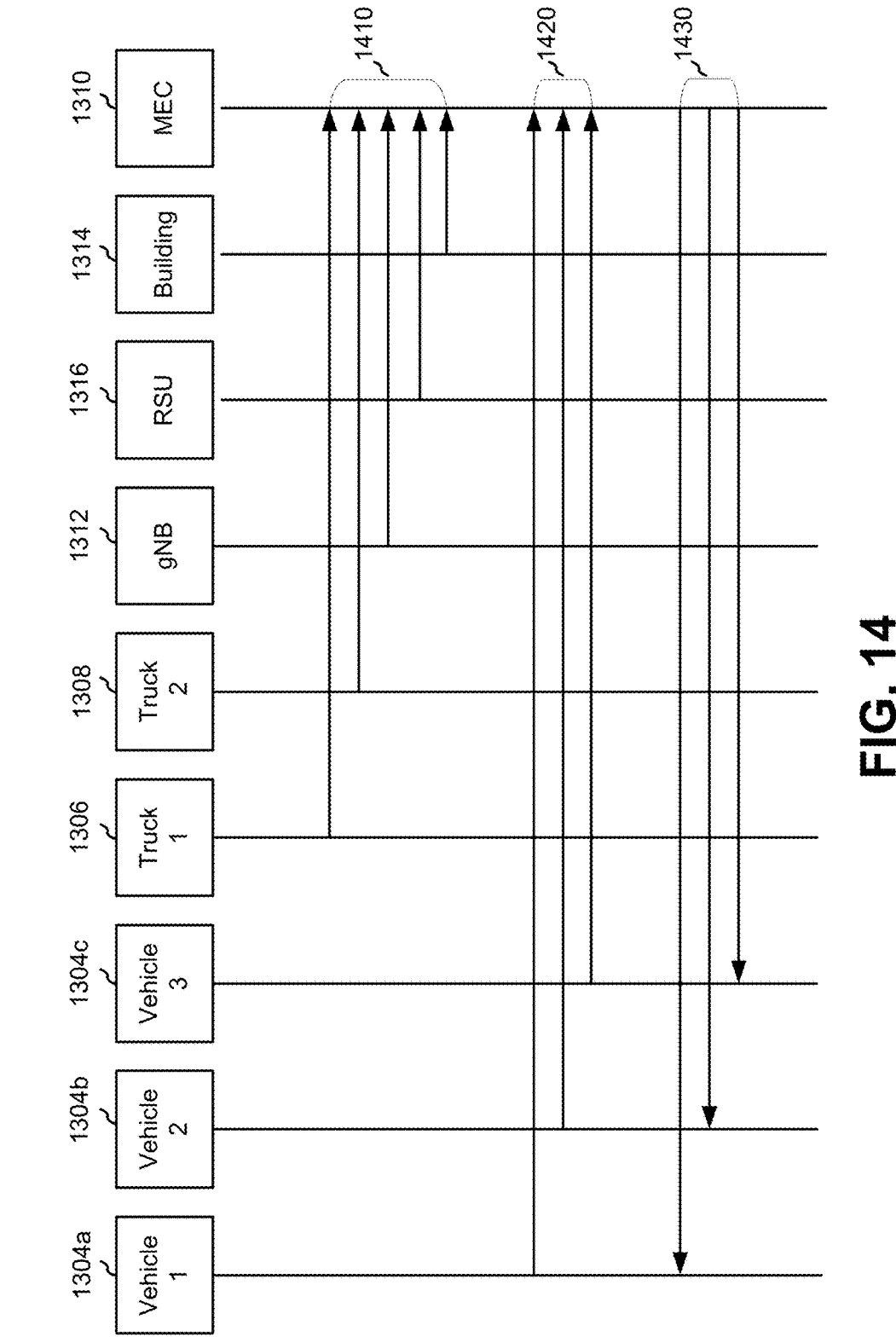
FIG. 14 is a diagram of an example of a communication (e.g., a V2X communications) exchange for sharing sensor data for the system of FIG. 13, in accordance with some aspects of the present disclosure.

FIG. 13 is a diagram of the disclosed system 1300 for providing vehicle situational awareness for an enhanced V2X see-through use case, in accordance with some aspects of the present disclosure. FIG. 14 is a diagram of an example of a communication (e.g., a V2X communications) exchange 1400 for sharing sensor data for the system 1300 of FIG. 13, in accordance with some aspects of the present disclosure.

In FIG. 13, the system 1300 is shown to include a plurality of equipped (e.g., V2X capable) network devices. The plurality of equipped network devices includes vehicles (e.g., automobiles) 1304a, 1304b, 1304c; vehicles (e.g., trucks) 1306, 1308; a traffic structure (e.g., stop light) 1320; a base station (e.g., a gNB or eNB) 1312; an RSU 1316; and an equipped structure (e.g., a building) 1314. The system 1300 also includes a network entity 1310, which is V2X-capable. In one or more examples, a multi-access edge computing (MEC) device may be employed for the network entity 1310. Also shown are a plurality of non-equipped network entities, which include VRUs (e.g., bicyclists) 1302a, 1302b, 1302c, and a structure (e.g., building) 1318. It should be noted that the disclosed system 1300 may comprise more or less equipped network devices and/or more or less non-equipped network entities, than as shown in FIG. 13. In addition, the disclosed system 1300 may comprise more or less different types of equipped network devices (e.g., which may include equipped UEs) and/or more or less different types of non-equipped network entities, (e.g., which may include non-equipped UEs) than as shown in FIG. 13. In addition, in one or more examples, the equipped network devices may be equipped with heterogeneous capability, which may include, but is not limited to, C-V2X/DSRC capability, 4G/5G cellular connectivity, radar capability, and/or LIDAR capability.

In one or more examples, the plurality of equipped network devices as well as the network entity 1310 are capable of performing V2X communications. In addition, at least some of the equipped network devices are capable of transmitting and receiving sensing signals for radar (e.g., RF sensing signals) and/or LIDAR (e.g., optical sensing signals). In one or more examples, vehicles 1306, 1308, base station 1312, RSU 1316, traffic structure 1320, and equipped structure 1314 are all capable of transmitting and receiving sensing signals of some kind (e.g., radar and/or LIDAR sensing signals).

In some examples, some of the equipped network devices may have higher capability sensors (e.g., RF antennas, and/or optical lasers and/or optical sensors) than other equipped network devices of the system 1300. For example, vehicle (e.g., a truck) 1306 may have higher capability LIDAR (e.g., high capability optical lasers and optical sensors) than the other equipped network devices in the system 1300, and the LIDAR of vehicle 1306 may be able to detect a VRU (e.g., cyclist) 1302a with a large degree of confidence or likelihood (e.g., a seventy percent degree of confidence indicating a seventy percent likelihood that the VRU is present). In another example, vehicle (e.g., a truck) 1308 may have higher capability radar (e.g., high capability RF antennas) than the other equipped network devices in the system 1300, and the radar of vehicle 1308 may be able to detect the VRU (e.g., cyclist) 1302a with a degree of confidence (e.g., a sixty percent degrees of confidence).

During operation of the disclosed system 1300, the network entity (e.g., a MEC) 1310, the RSU 1316, and/or at least one of the vehicles 1304a, 1304b, 1304c, 1306, 1308 may advertise a network-based sensor sharing service (e.g., a vehicle awareness service), which is managed by the network entity 1310, to share sensor data (e.g., radar data and/or LIDAR data) obtained from at least some of the equipped network devices that are capable of transmitting and receiving sensing signals for radar and/or LIDAR.

In one or more examples, the vehicles 1304a, 1304b, 1304c, 1306, 1308 may utilize SDSMs over a PC5 interface to advertise the network-based sensor sharing service. In some examples, the SDSMs may include the network entity's (e.g., MEC) 1310 internet protocol (IP) address, if the IP address is available. If the IP address of the network entity 1310 is not available, the SDSMs will provide alternatives. Depending upon the PC5 load and content, non-safety messages may be transmitted over the PC5 interface for the advertisement. In one or more examples, if the PC5 channel is not loaded (empty), the non-safety messages may stream over a department of transportation issued intelligent transport system (ITS) channel. In other examples, if the PC5 channel is loaded, an IP over a universal mobile telecommunications system (UMTS) air interface (Uu) may be used.

In some examples, the vehicles 1304a, 1304b, 1304c, 1306, 1308 (which may or may not be an obstructing vehicle) may advertise the network-based sensor sharing service by using a quick response (QR) code. For these examples, the QR code may be displayed on the vehicles 1304a, 1304b, 1304c, 1306, 1308 themselves (e.g., the QR code may be displayed on the rear license plate of a vehicle). In other examples, the vehicles 1304a, 1304b, 1304c, 1306, 1308 (which may or may not be an obstructing vehicle) may use any other type of short-range communication, such as visible light communication (VLC), to advertise the network-based sensor sharing service. In one or more examples, a follower vehicle may discover the network-based sensor sharing service from an obstructing vehicle (e.g., a vehicle obstructing the view of the follower vehicle) advertising (e.g., via QR code) the network-based sensor sharing service.

In one or more examples, the network entity 1310 and/or the RSU 1316 may advertise the network-based sensor sharing service. For these examples, the network entity 1310 and/or the RSU 1316 may utilize a wireless service advertisement (WSM) message over the PC5 interface to advertise the network-based sensor sharing service.

Also during operation of the system 1300, the network entity 1310 may receive sensing reports from a number of equipped network devices. For example, the network entity

1310 may receive sensing reports from equipped network devices, including vehicles 1306, 1308, traffic structure 1320, base station 1312, RSU 1316, and equipped structure 1314. FIG. 14 shows the vehicles 1306, 1308, traffic structure 1320, base station 1312, RSU 1316, and equipped structure 1314 sending messages (e.g., sensing reports messages 1410 of FIG. 14), which may be SDSMs or RSDMs, containing sensing reports to the network entity (e.g., MEC) 1310.

Each of the sensing reports may include sensing measurements (e.g., radar and/or LIDAR measurements) and/or information associated with a respective equipped network device. In one or more examples, the information may include a position of the respective equipped network device, an accuracy of the position of the respective equipped network device, a direction of the respective equipped network device, a speed of the respective equipped network device, a position of one or more obstacles (e.g., obstructions), VRUs, or other items, an accuracy of the position of the obstacle(s), VRUs, or other items, a direction of the obstacle(s), VRUs, or other items, and/or a speed of the obstacle(s). In one or more examples, the information may be determined by at least one of the equipped network devices using at least a portion of the sensing measurements. In some examples, the obstacles (e.g., obstructions) may include a vehicle, a structure, a VRU, and/or an object.

After receiving some or all of the sensing reports, the network entity 1310 may combine the sensing reports and analyze the data from the sensing reports to determine the overall traffic situation of the system 1300. For instance, based on the analysis, the network entity 1310 may decide which information from the sensing reports to transmit to one or more other devices (e.g., vehicles, RSUs, UEs, etc.) or which sensing reports (or information therefrom) from which to base one or more advisory messages. In one illustrative example, the network entity 1310 may use information that is associated with a confidence or likelihood above a threshold (e.g., greater than 70%, 75%, or other threshold). For example, a sensing report including information regarding an identified object (e.g., a VRU such as the cyclist 1302a of FIG. 13) may indicating that the VRU is identified with a 75% confidence. The network entity 1310 may determine that the 75% confidence is greater than a threshold of 70% confidence and may determine to transmit that information to one or more other vehicles or devices.

In response to the advertisement for the network-based sensor sharing service from the network entity 1310 (e.g., a MEC), the RSU 1316, and/or at least one of the vehicles 1304a, 1304b, 1304c, 1306, 1308, one or more of the equipped network devices (e.g., vehicles 1304a, 1304b, 1304c) may request to subscribe to the network-based sensor sharing service. In addition, along with the request to subscribe, the equipped network devices (e.g., vehicles 1304a, 1304b, 1304c) may each indicate a desired region of interest (ROI). The equipped network devices (e.g., vehicles 1304a, 1304b, 1304c) may request to subscribe (as well as indicate an ROI) by sending SDSM and/or RSDSM subscription requests (e.g., subscription requests 1420 of FIG. 14) to the network entity 1310. It should be noted that if the subscription requests do not contain an ROI, the network entity 1310 will assume that the entire FOV of sensors is desired. In one or more examples, there may be a number of different subscription levels that are available. For example, one subscription level may be a "traffic light advisory subscription." In one or more examples, a "traffic light advisory subscription" may provide to the subscribers advisory messages regarding traffic and road conditions within the traffic light intersections, when the traffic light intersections are not within view of the subscribers.

Upon receiving the requests to subscribe from the equipped network devices (e.g., vehicles 1304a, 1304b, 1304c), the network entity 1310 may transmit advisory messages (e.g., advisory messages 1430 of FIG. 14) to the equipped network devices (e.g., vehicles 1304a, 1304b, 1304c). For instance, as described above, after receiving some or all of the sensing reports, the network entity 1310 may combine the sensing reports and analyze the data from the sensing reports to determine the overall traffic situation of the system 1300. Based on the analysis, the network entity 1310 may decide which sensing reports or which information from the sensing reports from which to base one or more advisory messages, such as based on a confidence or likelihood included in the sensing reports (e.g., a confidence by which a particular obstacle, VRU, etc. is detected by a vehicle). In some cases, the advisory messages are warning messages that are used to warn the equipped network devices (e.g., vehicles 1304a, 1304b, 1304c) of upcoming unforeseen potential road dangers. In one or more examples, the advisory messages may be visual alerts, which may be displayed on a display to the driver, that may include textual messages and/or different colors, which are indicative of different levels of warning. In addition, advisory messages may be audible alerts, which may contain spoken words and/or warning tones or sounds, which may be indicative of different levels of warning.

For example, in FIG. 13, equipped network device (e.g., vehicle) 1304c is traveling towards an intersection, which contains the traffic structure (e.g., stop light) 1320. The non-equipped network entity (e.g., a building) 1318 is blocking the view of equipped network device (e.g., vehicle) 1304c regarding the non-equipped entities (e.g., VRUs, in the form of bicyclists) 1302a, 1302b, 1302c approaching the intersection. In this example, the network entity 1310 may transmit a customized advisory message (e.g., one of the advisory messages 1430 of FIG. 14) to the equipped network device (e.g., vehicle) 1304c to warn the equipped network device (e.g., vehicle) 1304c that non-equipped entities (e.g., VRUs, in the form of bicyclists) 1302a, 1302b, 1302c are located behind the obstructing non-equipped network entity (e.g., a building) 1318 and are approaching the intersection. Once the equipped network device (e.g., vehicle) 1304c receives the advisory message, the equipped network device (e.g., vehicle) 1304c can proceed to slow down to a safe driving speed or maintain a safe driving speed in anticipation of the oncoming non-equipped entities (e.g., VRUs, in the form of bicyclists) 1302a, 1302b, 1302c.

In one or more examples, upon receiving the requests to subscribe from the equipped network devices (e.g., vehicles 1304a, 1304b, 1304c), the network entity 1310 may determine an appropriate delivery mechanism for delivering (transmitting) the advisory messages to the equipped network devices (e.g., vehicles 1304a, 1304b, 1304c). In some examples, if the equipped network device (e.g., vehicles 1304a, 1304b, 1304c) is equipped with a V2X capability, the network entity 1310 may choose to deliver (transmit) the advisory message to the equipped network device (e.g., vehicles 1304a, 1304b, 1304c) by using an infrastructure-to-vehicle (I2V) interface. In other examples, if the equipped network device (e.g., vehicles 1304a, 1304b, 1304c) is equipped with a Uu capability, the network entity 1310 may choose to deliver (transmit) the advisory message to the equipped network device (e.g., vehicles 1304a, 1304b, 1304c) by using a Uu interface.

In one or more examples, the network entity 1310 may determine a priority for delivering (or transmitting) the advisory messages to the equipped network devices (e.g., vehicles 1304a, 1304b, 1304c). In some cases, the network entity 1310 may determine a priority for delivering (or transmitting) the advisory messages to an equipped network device based on a network capability of the network device. For instance, in some examples, the network entity 1310 may prioritize delivery of the advisory messages first to network devices that are not V2X enabled more so than to network devices that are V2X enabled. For example, it is assumed that network devices that are V2X enabled are more aware of their surroundings than network devices that are not V2X enabled. In other examples, the network entity 1310 may determine a priority for the delivering (transmitting) of the advisory messages to the equipped network devices (e.g., vehicles 1304a, 1304b, 1304c) by determining the required distance needed for safe operation of the vehicle for each of the equipped network devices (e.g., vehicles 1304a, 1304b, 1304c). The description of FIG. 16 provides a detailed explanation of how the network entity 1310 may determine and use the required distance needed for safe operation of the vehicle for determining a priority for the delivering (transmitting) of the advisory messages to the equipped network devices (e.g., vehicles 1304a, 1304b, 1304c).

In one or more examples, if the equipped network devices (e.g., vehicles 1304a, 1304b, 1304c) would like to unsubscribe to the network-based sensor sharing service, the equipped network devices (e.g., vehicles 1304a, 1304b, 1304c) may request to unsubscribe by sending SDSM and/or RSDSM unsubscribe requests to the network entity 1310. After receiving the unsubscribe requests, the network entity 1310 will end the subscriptions to the network-based sensor sharing service for the equipped network devices (e.g., vehicles 1304a, 1304b, 1304c).

Figure 15:
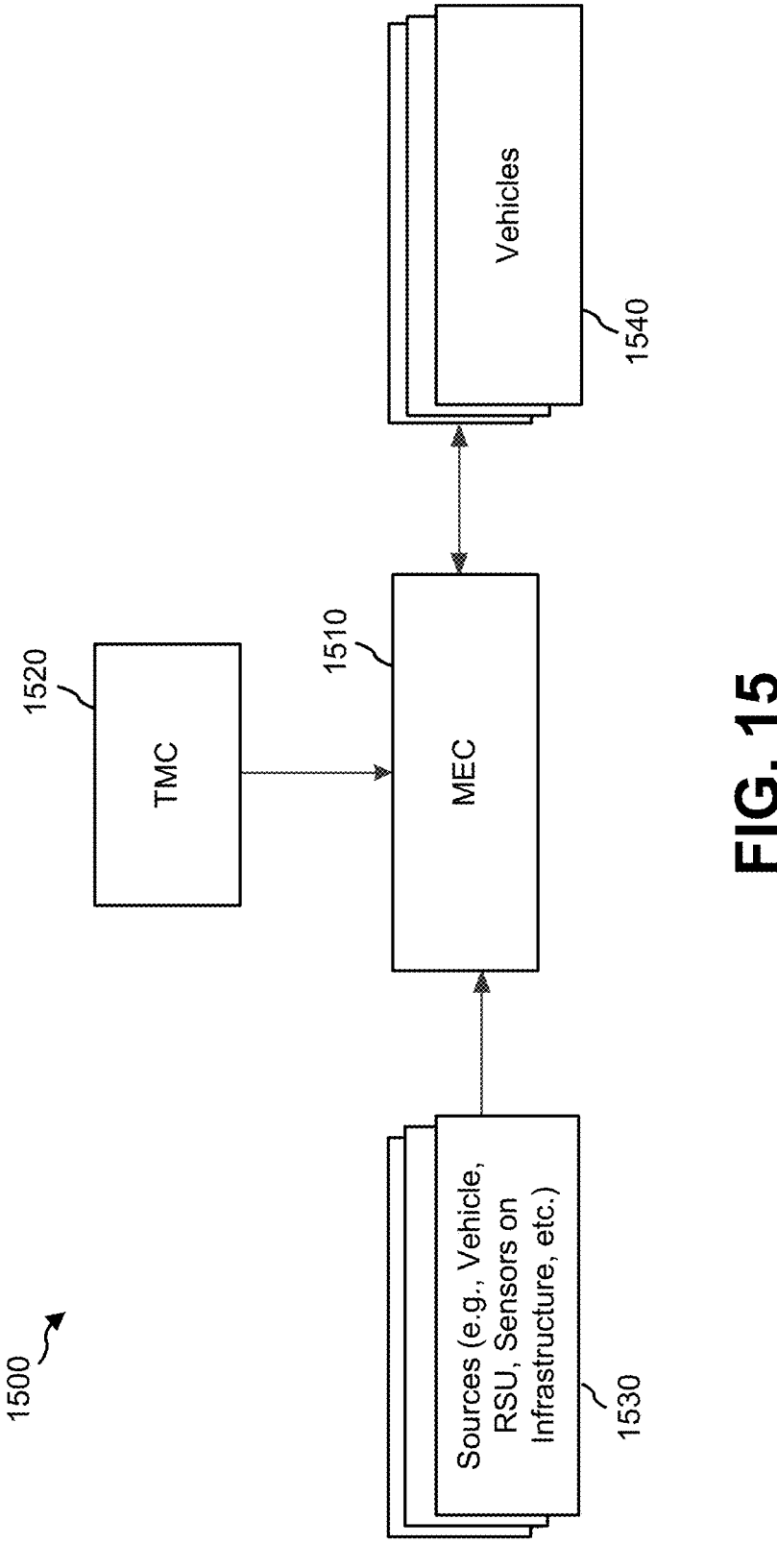
FIG. 15 is a diagram illustrating the processing of data by a network entity of the disclosed system for providing vehicle situational awareness for an enhanced V2X see-through use case, in accordance with some aspects of the present disclosure.

FIG. 15 is a diagram 1500 illustrating the processing of data by a network entity (e.g., a MEC) 1510 of the disclosed system for providing vehicle situational awareness for an enhanced V2X see-through use case, in accordance with some aspects of the present disclosure. During operation of the disclosed system (e.g., system 1300 of FIG. 13), the network entity (e.g., network entity 1310 of FIG. 13) 1510 may receive and analyze a plurality of data from a variety of different sources to determine and generate advisory messages for network devices (e.g., vehicles) that have subscribed to the network-based sensor sharing service. In FIG. 15, in one or more examples, the network entity 1510 may receive sensor reports from a plurality of sources (e.g., which may include vehicles, RSUs, and structures, which may include sensors on infrastructure) 1530. The sensor reports may include sensing measurements (e.g., radar and/ or LIDAR measurements). In one or more examples, the network entity 1510 may also receive road topology information as well as traffic conditions information from the sources (e.g., RSUs) 1530. In addition, in some examples, the network entity 1510 may receive signal (e.g., messages) phase and timing information from the sources (e.g., RSUs) 1530.

In one or more examples, the network entity 1510 may also receive data from the vehicles 1540 (e.g., consumer vehicles). The data from the vehicles 1540 may include information regarding the specific vehicle, such as speed, direction, dimension/size, location, automation level (e.g., ADAS level of the vehicle), need for safety advisory, vehicle type (e.g., sedan, truck, sports utility vehicle, motorcycle, bicycle, or scooter), and subscription level for the network-based sensor sharing service. In some examples, the network entity 1510 may receive data from a TMC 1520, which may include environmental data, such as the time of day as well as weather conditions (e.g., rain or fog).

Once the network entity 1510 has received the data from the sources 1530, the vehicles 1540, and the TMC 1520, the network entity 1510 may utilize at least a portion of the data to determine and generate advisory messages for the network devices (e.g., vehicles) that have subscribed to the network-based sensor sharing service.

FIG. 16 is a table 1600 showing example required safe stopping distances for vehicles traveling at different speeds, which may be used to determine the required distance needed for safe operation of a vehicle, in accordance with some aspects of the present disclosure. In order to determine the priority of the transmission of the advisory messages to the equipped network devices (e.g., vehicles 1304a, 1304b, 1304c of FIG. 13), the network entity (e.g., network entity 1310 of FIG. 13, such as a MEC) may use the required distance needed for safe operation of a vehicle (e.g., the "safe distance" in table 1600). For example, the network entity may choose to transmit an advisory message first to a vehicle that is located a distance away from an unforeseen obstacle, where the distance is equal to less than the required distance needed for safe operation of that vehicle. The required distance needed for safe operation of a vehicle is related to the stopping distance of a vehicle, which is dependent upon the speed of which the vehicle is travelling. The network entity (e.g., network entity 1310 of FIG. 13, such as a MEC) may use location, direction, and speed information it receives from the vehicles to calculate the required distance needed for safe operation of each of the vehicles.

The American Association of State Highway and Transportation Officials (AASHTO) provides the following formula to estimate the stopping distance for a vehicle. The stopping distance is equal to $s=(0.278*t*v)+v^2/(254*(f+G))$, where s is the stopping distance measured in meters, t is the perception-reaction time in seconds, v is the speed of the vehicle in kilometers per hour (km/h), G is the grade (slope) of the road (expressed as a decimal, which is positive to denote an uphill slope), and f is the coefficient of friction between the tires of the vehicle and the road (e.g., typically equal to 0.7 for a dry road, and within a range from 0.3 to 0.4 for a wet road).

It should be noted that the reaction time for a driver, who is not impaired, is typically around 1.5 seconds, as is shown in the table 1600. The reaction time for an autonomous vehicle will depend upon the advanced driver assist system (ADAS) of the autonomous vehicle. If the vehicle is fully autonomous, the reaction time will be much less than the reaction time for a driver. For example, the reaction time for a fully autonomous vehicle may be approximately 0.10 seconds, as opposed to 1.5 seconds for a driver, who is not impaired.

FIG. 17 is a flow diagram of an example process 1700 for wireless communication, such as for providing an enhanced vehicle-based communication (e.g., V2X) see-through use case, in accordance with some aspects of the present disclosure. The process 1700 can be performed by a network entity (e.g., a multi-access edge computing (MEC) device, a base station such as an eNB or a gNB or a portion thereof, such as one or more of a CU, a DU, a RU, a Near-RT RIC, or a Non-RT RIC of the base station) or by a component or system (e.g., a chipset) of the network entity. For example, the network entity may include the network entity 1310 of FIG. 13, the gNB 1312 of FIG. 13, the MEC of FIG. 15, or other network entity. The operations of the process 1700 may be implemented as software components that are executed or run on one or more controllers or processors of the network entity (e.g., the processor 1910 of FIG. 19, the memory 1915 of FIG. 19, the ROM 1920 of FIG. 19, the RAM 1925 of FIG. 19, or other controller(s) or processor(s)). Further, the transmission and reception of signals by the network entity in the process 1700 may be enabled, for example, by one or more antennas and/or one or more transceivers (e.g., the communication interface 1940 of FIG. 19 or other antenna(s) and/or transceiver(s)).

At block 1710, the network entity (or component thereof) may receive sensor data from one or more devices. The one or more devices may include a vehicle, a base station or portion thereof (e.g., one or more of a CU, a DU, a RU, a Near-RT RIC, or a Non-RT RIC of the base station), a roadside unit (RSU), user equipment (UE), a network-equipped structure, any combination thereof, or other device(s). The sensor data may include sensing measurements associated with one or more objects in an environment, information associated with a respective device of the one or more devices, and/or other sensor data. In some cases, the network entity (or component thereof) may determine the information from the sensing measurements or from a portion of the sensing measurements. In some examples, the sensing measurements include radar measurements, light detection and ranging (LIDAR) measurements, or other measurements from one or more sensors.

In some aspects, the information includes a position of the respective device, an accuracy of the position of the respective device, a direction of the respective device, a speed of the respective device, a position of one or more obstacles, an accuracy of the position of the one or more obstacles, a direction of the one or more obstacles, a speed of the one or more obstacles, any combination thereof, or other information associated with each respective device. In some examples, the one or more obstacles include a vehicle, a structure, a vulnerable road user (VRU), an object, any combination thereof, or other obstacle.

At block 1720, the network entity (or component thereof) may generate one or more advisory messages for one or more recipient vehicles based on at least a portion of the sensor data. In one illustrative example, the one or more advisory messages include a warning message associated with one or more obstacles in a path of the one or more recipient vehicles. In some aspects, the network entity (or component thereof) may generate the one or more advisory messages for the one or more recipient vehicles further based on information associated with the environment. In some cases, the information associated with the environment includes weather information, traffic information, pedestrian information, lighting conditions information, road topology information, obstructions information, any combination thereof, and/or other environmental information.

At block 1730, the network entity (or component thereof) may transmit (or output for transmission) the one or more advisory messages to the one or more recipient vehicles. In one illustrative example, the network entity (or component thereof) may receive first sensor data from a first device and second sensor data from a second device. The network entity (or component thereof) may generate the one or more advisory messages is based on the first sensor data and the second sensor data. In some aspects, the network entity (or component thereof) may generate the one or more advisory messages for the one or more recipient vehicles further based on information indicating a likelihood (or confidence) that at least one object is located in a path of at least one of the one or more recipient vehicles. For instance, based on analysis of one or more reports from the one or more devices, the network entity may determine which information from the sensing reports to transmit to one or more other devices (e.g., vehicles, RSUs, UEs, etc.) or which sensing reports (or information therefrom) from which to base one or more advisory messages. In one illustrative example referring to the first and second sensor data noted above, the network entity (or component thereof) may obtain information indicating a likelihood that an object is located in a path of a recipient vehicle. The network entity (or component thereof) may generate an advisory message based on the first sensor data, the second sensor data, and the information indicating the likelihood that the object is located in the path of the recipient vehicle. In such an example, the network entity (or component thereof) may transmit the advisory message to the recipient vehicle.

In some cases, the network entity (or component thereof) may determine a delivery mechanism for transmission of the one or more advisory messages to a recipient vehicle of the one or more recipient vehicles based on a network capability of the recipient vehicle. For instance, the delivery mechanism may be an infrastructure-to-vehicle (I2V) interface, a universal mobile telecommunications system (UMTS) air interface (Uu), a visible light communication (VLC) interface, or other delivery mechanism.

In some examples, the network entity (or component thereof) may determine a priority of transmission for transmitting the one or more advisory messages to the one or more recipient vehicles. For instance, as described above, a network entity (e.g., network entity 1310 of FIG. 13, such as a MEC) may use a required distance needed for safe operation of a vehicle (e.g., the "safe distance" in table 1600) when determining the priority of transmission. In one illustrative example, the network entity may choose to transmit an advisory message first to a vehicle that is located a distance away from an unforeseen obstacle, with the distance being equal to less than the required distance needed for safe operation of that vehicle. In other examples, the network entity (e.g., network entity 1310 of FIG. 13, such as a MEC) may use location, direction, and speed information it receives from the vehicles to determine the priority (e.g., to calculate the required distance needed for safe operation of each of the vehicles).

FIG. 18 is a flow diagram of an example process 1800 for wireless communication, such as for providing an enhanced vehicle-based communication (e.g., V2X) see-through use case, in accordance with some aspects of the present disclosure. The process 1800 can be performed by a computing device (e.g., a vehicle or other user equipment (UE) such as mobile device, vehicle, roadside unit (RSU) or other UE) or by a component or system (e.g., a chipset) of the computing device. For example, the computing device may include the vehicle computing system 450 (or component thereof) of FIG. 4, the user device computing system 570 (or component thereof) of FIG. 5, one or more of the vehicles described above with reference to FIG. 9 through FIG. 15, or other computing device. The operations of the process 1800 may be implemented as software components that are executed and run on one or more controllers or processors of the radar receiver (e.g., the control system 452 of FIG. 4, the intelligent transport system 455 of FIG. 4, the processor(s) 584 of FIG. 5, the DSP(s) 582 of FIG. 5, the memory device(s) 586 of FIG. 5, the processor 1910 of FIG. 19, the memory 1915 of FIG. 19, the ROM 1920 of FIG. 19, the RAM 1925 of FIG. 19, or other controller(s) or processor(s)). Further, the transmission and reception of signals by the radar receiver in the process 1800 may be enabled, for example, by one or more antennas and/or one or more transceivers (e.g., one or more antennas and/or one or more transceivers of the communications system 458 of FIG. 4, the antenna 587 of FIG. 5, the wireless transceiver(s) 578 of FIG. 5, the modem(s) 576 of FIG. 5, the SIM(s) of FIG. 5, the communication interface 1940 of FIG. 19, any combination thereof, or other antenna(s) and/or transceiver(s)).

At block 1810, the computing device (or component thereof) may transmit sensor data to a network entity. The network entity may be a multi-access edge computing (MEC) device, a base station such as an eNB or a gNB or a portion thereof, such as one or more of a CU, a DU, a RU, a Near-RT RIC, or a Non-RT RIC of the base station. For example, the network entity may include the network entity 1310 of FIG. 13, the gNB 1312 of FIG. 13, the MEC of FIG. 15, or other network entity. The sensor data may include sensing measurements associated with one or more objects in an environment, information associated with the computing device (e.g., the vehicle), and/or other sensor data. In some cases, the network entity (or component thereof) may determine the information from the sensing measurements or from a portion of the sensing measurements. In some examples, the sensing measurements include radar measurements, light detection and ranging (LIDAR) measurements, or other measurements from one or more sensors.

In some examples, the information includes a position of the computing device, an accuracy of the position of the computing device, a direction of the computing device, a speed of the computing device, a position of one or more obstacles, an accuracy of the position of the one or more obstacles, a direction of the one or more obstacles, a speed of the one or more obstacles, any combination thereof, or other information associated with the computing device. In some examples, the one or more obstacles include a vehicle, a structure, a vulnerable road user (VRU), an object, any combination thereof, or other obstacle. In some aspects, the information is determined from at least a portion of the sensing measurements. For example, in some cases, the computing device (or component thereof) may determine the information (e.g., the position of the computing device, the position of the one or more obstacles, etc.) based on sensing measurements measured or obtained by the computing device (e.g., using one or more sensors of the computing device).

At block 1820, the computing device (or component thereof) may receive one or more advisory messages from the network entity. The computing device (or component thereof) may generate the one or more advisory messages using sensor data from one or more devices. In some aspects, the one or more advisory messages comprise a warning message associated with one or more obstacles in a path of the one or more recipient vehicles.

In some aspects, the computing device (or component thereof) may subscribe to vehicle awareness services provided by the network entity. For example, as described above, in response to advertisement for a network-based sensor sharing service from the network entity 1310 (which may include a MEC or other network entity) or other device (e.g., at least one of the vehicles 1304a, 1304b, 1304c, 1306, 1308 and/or the RSU 1316), a vehicle (e.g., vehicles 1304a, 1304b, 1304c) or other equipped device may request to subscribe to the network-based sensor sharing service. In some cases, along with the request to subscribe, the equipped network devices (e.g., vehicles 1304a, 1304b, 1304c) may each indicate a desired region of interest (ROI).

For instance, the equipped network devices (e.g., vehicles 1304a, 1304b, 1304c) may request to subscribe (as well as indicate an ROI) by sending SDSM and/or RSDSM subscription requests (e.g., subscription requests 1420 of FIG. 14) to the network entity 1310. In some cases, there may be a number of different subscription levels that are available (e.g., a "traffic light advisory subscription," a "traffic light advisory subscription," or other subscription level), as described above. Upon receiving the requests to subscribe from the equipped network devices (e.g., vehicles 1304a, 1304b, 1304c), the network entity 1310 may transmit advisory messages (e.g., advisory messages 1430 of FIG. 14) to the equipped network devices (e.g., vehicles 1304a, 1304b, 1304c).

Figure 19:
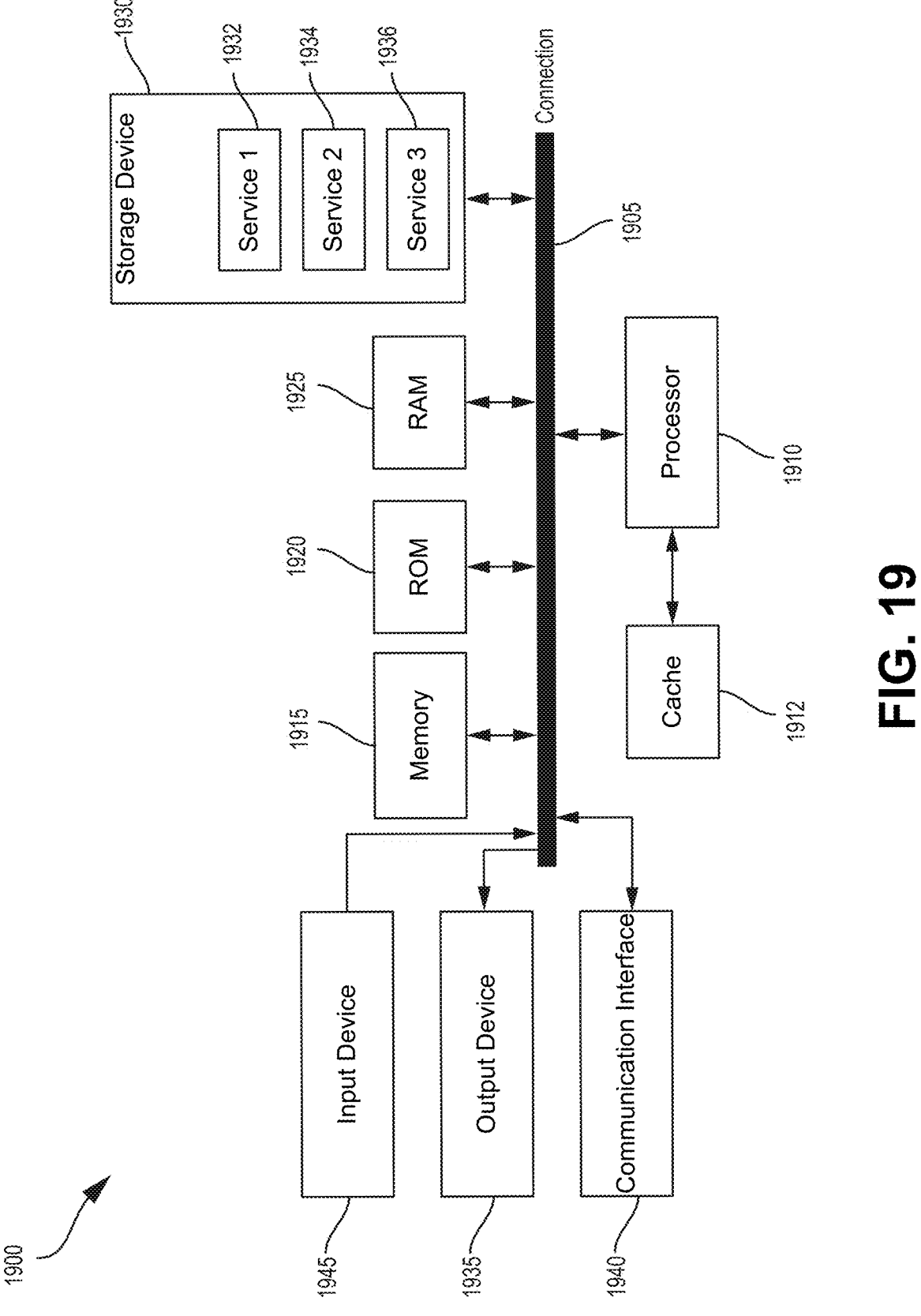
FIG. 19 is a block diagram illustrating an example of a computing system, in accordance with some aspects of the present disclosure.

FIG. 19 is a diagram illustrating an example of a system for implementing certain aspects of the present technology. In particular, FIG. 19 illustrates an example of computing system 1900, which can be for example any computing device making up internal computing system, a remote computing system, a camera, or any component thereof in which the components of the system are in communication with each other using connection 1905. Connection 1905 can be a physical connection using a bus, or a direct connection into processor 1910, such as in a chipset architecture. Connection 1905 can also be a virtual connection, networked connection, or logical connection.

In some aspects, computing system 1900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1900 includes at least one processing unit (CPU or processor) 1910 and connection 1905 that communicatively couples various system components including system memory 1915, such as read-only memory (ROM) 1920 and random access memory (RAM) 1925 to processor 1910. Computing system 1900 can include a cache 1912 of high-speed memory connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms. In some instances, multimodal systems can enable a user to provide multiple types of input/output to communicate with computing system 1900.

Computing system 1900 can include communications interface 1940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1940 may also include one or more Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1930 can include software services, servers, services, etc., that when the code that defines such software is executed by the processor 1910, it causes the system to perform a function. In some aspects, a hardware service that performs a particular function can include the software component stored in a computer-readable medium in connection with the necessary hardware components, such as processor 1910, connection 1905, output device 1935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method for wireless communication at a network entity, the method comprising: receiving, at the network entity, sensor data from one or more devices, the sensor data comprising at least one of sensing measurements associated with one or more objects in an environment or information associated with a respective device of the one or more devices; generating, at the network entity, one or more advisory messages for one or more recipient vehicles based on at least a portion of the sensor data; and transmitting, from the network entity, the one or more advisory messages to the one or more recipient vehicles.

Aspect 2. The method of Aspect 1, wherein the network entity is a multi-access edge computing (MEC) device, a base station, a central unit of a base station, or a distributed unit of a base station.

Aspect 3. The method of any of Aspects 1 to 2, wherein the one or more devices comprises at least one of a vehicle, a base station, a central unit of the base station, or a distributed unit of the base station, a roadside unit (RSU), user equipment (UE), or a network-equipped structure.

Aspect 4. The method of Aspect 3, wherein the base station is one of a gNodeB (gNB) or an evolved NodeB (eNB).

Aspect 5. The method of any of Aspects 1 to 4, wherein the information comprises at least one of a position of the respective device, an accuracy of the position of the respective device, a direction of the respective device, a speed of the respective device, a position of one or more obstacles, an accuracy of the position of the one or more obstacles, a direction of the one or more obstacles, or a speed of the one or more obstacles.

Aspect 6. The method of Aspect 5, wherein the one or more obstacles comprises at least one of a vehicle, a structure, a vulnerable road user (VRU), or an object.

Aspect 7. The method of any of Aspects 1 to 6, wherein the information is determined from at least a portion of the sensing measurements.

Aspect 8. The method of any of Aspects 1 to 7, wherein the sensing measurements comprise at least one of radar measurements or light detection and ranging (LIDAR) measurements.

Aspect 9. The method of any of Aspects 1 to 8, wherein the one or more advisory messages comprise a warning message associated with one or more obstacles in a path of the one or more recipient vehicles.

Aspect 10. The method of any of Aspects 1 to 9, further comprising: determining, by the network entity, a delivery mechanism for transmission of the one or more advisory messages to a recipient vehicle of the one or more recipient vehicles based on a network capability of the recipient vehicle.

Aspect 11. The method of Aspect 10, wherein the delivery mechanism is one of an infrastructure-to-vehicle (I2V) interface, a universal mobile telecommunications system (UMTS) air interface (Uu), or a visible light communication (VLC) interface.

Aspect 12. The method of any of Aspects 1 to 11, further comprising: determining, by the network entity, a priority of the transmitting of the one or more advisory messages to the one or more recipient vehicles.

Aspect 13. The method of any of Aspects 1 to 12, wherein generating the one or more advisory messages for the one or more recipient vehicles is further based on information associated with the environment.

Aspect 14. The method of Aspect 13, wherein the information associated with the environment comprises at least one of weather information, traffic information, pedestrian information, lighting conditions information, road topology information, or obstructions information.

Aspect 15. The method of any of Aspects 1 to 14, wherein generating the one or more advisory messages for the one or more recipient vehicles is further based on information indicating a likelihood that at least one object is located in a path of at least one of the one or more recipient vehicles.

Aspect 16. The method of any of Aspects 1 to 15, wherein: receiving the sensor data from the one or more devices includes receiving first sensor data from a first device and receiving second sensor data from a second device; and generating the one or more advisory messages is based on the first sensor data and the second sensor data.

Aspect 17. The method of Aspect 16, further comprising: obtaining information indicating a likelihood that an object is located in a path of a recipient vehicle; wherein generating the one or more advisory messages includes generating an advisory message based on the first sensor data, the second sensor data, and the information indicating the likelihood that the object is located in the path of the recipient vehicle; and wherein transmitting the one or more advisory messages includes transmitting the advisory message to the recipient vehicle.

Aspect 18. An apparatus for wireless communication, comprising: a memory; and one or more processors coupled to the memory, the one or more processors configured to: receive sensor data from one or more devices, the sensor data comprising at least one of sensing measurements associated with one or more objects in an environment or information associated with a respective device of the one or more devices; generate one or more advisory messages for one or more recipient vehicles based on at least a portion of the sensor data; and output the one or more advisory messages for transmission to the one or more recipient vehicles.

Aspect 19. The apparatus of Aspect 18, wherein the apparatus is a multi-access edge computing (MEC) device, a base station, a central unit of a base station, or a distributed unit of a base station.

Aspect 20. The apparatus of any of Aspects 18 to 19, wherein the one or more devices comprises at least one of a vehicle, a base station, a central unit of the base station, or a distributed unit of the base station, a roadside unit (RSU), user equipment (UE), or a network-equipped structure.

Aspect 21. The apparatus of Aspect 20, wherein the base station is one of a gNodeB (gNB) or an evolved NodeB (eNB).

Aspect 22. The apparatus of any of Aspects 18 to 21, wherein the information comprises at least one of a position of the respective device, an accuracy of the position of the respective device, a direction of the respective device, a speed of the respective device, a position of one or more obstacles, an accuracy of the position of the one or more obstacles, a direction of the one or more obstacles, or a speed of the one or more obstacles.

Aspect 23. The apparatus of Aspect 22, wherein the one or more obstacles comprises at least one of a vehicle, a structure, a vulnerable road user (VRU), or an object.

Aspect 24. The apparatus of any of Aspects 18 to 23, wherein the one or more processors are configured to determine the information from at least a portion of the sensing measurements.

Aspect 25. The apparatus of any of Aspects 18 to 24, wherein the sensing measurements comprise at least one of radar measurements or light detection and ranging (LIDAR) measurements.

Aspect 26. The apparatus of any of Aspects 18 to 25, wherein the one or more advisory messages comprise a warning message associated with one or more obstacles in a path of the one or more recipient vehicles.

Aspect 27. The apparatus of any of Aspects 18 to 26, wherein the one or more processors are configured to: determine a delivery mechanism for transmission of the one or more advisory messages to a recipient vehicle of the one or more recipient vehicles based on a network capability of the recipient vehicle.

Aspect 28. The apparatus of Aspect 27, wherein the delivery mechanism is one of an infrastructure-to-vehicle (I2V) interface, a universal mobile telecommunications system (UMTS) air interface (Uu), or a visible light communication (VLC) interface.

Aspect 29. The apparatus of any of Aspects 18 to 28, wherein the one or more processors are configured to: determine a priority of transmission of the one or more advisory messages to the one or more recipient vehicles.

Aspect 30. The apparatus of any of Aspects 18 to 29, wherein the one or more processors are configured to generate the one or more advisory messages for the one or more recipient vehicles further based on information associated with the environment.

Aspect 31. The apparatus of Aspect 30, wherein the information associated with the environment comprises at least one of weather information, traffic information, pedestrian information, lighting conditions information, road topology information, or obstructions information.

Aspect 32. The apparatus of any of Aspects 18 to 31, wherein the one or more processors are configured to generate the one or more advisory messages for the one or more recipient vehicles further based on information indicating a likelihood that at least one object is located in a path of at least one of the one or more recipient vehicles.

Aspect 33. The apparatus of any of Aspects 18 to 32, wherein the one or more processors are configured to: receive the sensor data from the one or more devices includes receiving first sensor data from a first device and receiving second sensor data from a second device; and generate the one or more advisory messages is based on the first sensor data and the second sensor data.

Aspect 34. The apparatus of Aspect 33, wherein the one or more processors are configured to: obtain information indicating a likelihood that an object is located in a path of a recipient vehicle; wherein generating the one or more advisory messages includes generating an advisory message based on the first sensor data, the second sensor data, and the information indicating the likelihood that the object is located in the path of the recipient vehicle; and wherein transmitting the one or more advisory messages includes transmitting the advisory message to the recipient vehicle.

Aspect 35. A method for wireless communications at a vehicle, the method comprising: transmitting, from the vehicle, sensor data to a network entity, the sensor data comprising at least one of sensing measurements associated with one or more objects in an environment or information associated with the vehicle; and receiving, at the vehicle, one or more advisory messages from the network entity, wherein the one or more advisory messages are generated by the network entity using sensor data from one or more devices.

Aspect 36. The method of Aspect 35, further comprising: subscribing, by the vehicle, to vehicle awareness services provided by the network entity.

Aspect 37. The method of any of Aspects 35 to 36, wherein the network entity is a multi-access edge computing (MEC) device, a base station, a central unit of a base station, or a distributed unit of a base station.

Aspect 38. The method of any of Aspects 35 to 37, wherein the information comprises at least one of a position of the vehicle, an accuracy of the position of the vehicle, a direction of the vehicle, a speed of the vehicle, a position of one or more obstacles, an accuracy of the position of the one or more obstacles, a direction of the one or more obstacles, or a speed of the one or more obstacles.

Aspect 39. The method of Aspect 38, wherein the one or more obstacles comprises at least one of a vehicle, a structure, a vulnerable road user (VRU), or an object.

Aspect 40. The method of any of Aspects 35 to 39, wherein the information is determined from at least a portion of the sensing measurements.

Aspect 41. The method of any of Aspects 35 to 40, wherein the sensing measurements comprise at least one of radar measurements or light detection and ranging (LIDAR) measurements.

Aspect 42. The method of any of Aspects 35 to 41, wherein the one or more advisory messages comprise a warning message associated with one or more obstacles in a path of the one or more recipient vehicles.

Aspect 43. An apparatus for wireless communication, comprising a memory and one or more processors (e.g., implemented in circuitry) coupled to the memory. The one or more processors are configured to: transmit sensor data to a network entity, the sensor data comprising at least one of sensing measurements associated with one or more objects in an environment or information associated with the apparatus; and receive one or more advisory messages from the network entity, wherein the one or more advisory messages are generated by the network entity using sensor data from one or more devices.

Aspect 44. The apparatus of Aspect 43, wherein the one or more processors are configured to: subscribe to vehicle awareness services provided by the network entity.

Aspect 45. The apparatus of any of Aspects 43 to 44, wherein the network entity is a multi-access edge computing (MEC) device, a base station, a central unit of a base station, or a distributed unit of a base station.

Aspect 46. The apparatus of any of Aspects 43 to 45, wherein the information comprises at least one of a position of the apparatus, an accuracy of the position of the apparatus, a direction of the apparatus, a speed of the apparatus, a position of one or more obstacles, an accuracy of the position of the one or more obstacles, a direction of the one or more obstacles, or a speed of the one or more obstacles.

Aspect 47. The apparatus of Aspect 46, wherein the one or more obstacles comprises at least one of a vehicle, a structure, a vulnerable road user (VRU), or an object.

Aspect 48. The apparatus of any of Aspects 43 to 47, wherein the information is determined from at least a portion of the sensing measurements.

Aspect 49. The apparatus of any of Aspects 43 to 48, wherein the sensing measurements comprise at least one of radar measurements or light detection and ranging (LIDAR) measurements.

Aspect 50. The apparatus of any of Aspects 43 to 49, wherein the one or more advisory messages comprise a warning message associated with one or more obstacles in a path of the one or more recipient vehicles.

Aspect 51. At least one non-transitory computer-readable medium containing instructions which, when executed by one or more processors, cause the one or more processors to perform operations according to any of Aspects 1 to 34.

Aspect 52. An apparatus comprising means for performing operations according to any of Aspects 1 to 34.

Aspect 53. At least one non-transitory computer-readable medium containing instructions which, when executed by one or more processors, cause the one or more processors to perform operations according to any of Aspects 35 to 50.

Aspect 54. An apparatus comprising means for performing operations according to any of Aspects 35 to 50.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically stated, but rather "one or more."

What is claimed is:

1. A method for wireless communication at a network entity, the method comprising:
   receiving, at the network entity, sensor data from one or more devices, the sensor data comprising information associated with a respective device of the one or more devices, wherein the information comprises (i) a position of the respective device and an accuracy of the position of the respective device, (ii) a direction of the respective device, (iii) a speed of the respective device, (iv) a position of one or more obstacles, and (v) an accuracy of the position of the one or more obstacles;
   generating, at the network entity, one or more advisory messages related to the one or more obstacles for one or more recipient vehicles based on the sensor data; and
   transmitting, from the network entity, the one or more advisory messages to the one or more recipient vehicles.

2. The method of claim 1, wherein the network entity is a multi-access edge computing (MEC) device, a base station, a central unit of a base station, or a distributed unit of a base station.

3. The method of claim 1, wherein the one or more devices comprises at least one of a vehicle, a base station, a central unit of the base station, or a distributed unit of the base station, a roadside unit (RSU), user equipment (UE), or a network-equipped structure.

4. The method of claim 3, wherein the base station is one of a gNodeB (gNB) or an evolved NodeB (eNB).

5. The method of claim 1, wherein the information is determined from at least a portion of sensing measurements associated with one or more objects in an environment.

6. The method of claim 5, wherein the sensing measurements comprise at least one of radar measurements or light detection and ranging (LIDAR) measurements.

7. The method of claim 1, further comprising:
   determining, by the network entity, a delivery mechanism for transmission of the one or more advisory messages to a recipient vehicle of the one or more recipient vehicles based on a network capability of the recipient vehicle.

8. The method of claim 7, wherein the delivery mechanism is one of an infrastructure-to-vehicle (I2V) interface, a universal mobile telecommunications system (UMTS) air interface (Uu), or a visible light communication (VLC) interface.

9. The method of claim 1, further comprising:
determining, by the network entity, a priority of the transmitting of the one or more advisory messages to the one or more recipient vehicles.

10. The method of claim 1, wherein generating the one or more advisory messages for the one or more recipient vehicles is further based on information associated with an environment.

11. The method of claim 10, wherein the information associated with the environment comprises at least one of weather information, traffic information, pedestrian information, lighting conditions information, road topology information, or obstructions information.

12. The method of claim 1, wherein generating the one or more advisory messages for the one or more recipient vehicles is further based on information indicating a likelihood that at least one object is located in a path of at least one of the one or more recipient vehicles.

13. The method of claim 1, wherein:
receiving the sensor data from the one or more devices includes receiving first sensor data from a first device and receiving second sensor data from a second device; and
generating the one or more advisory messages is based on the first sensor data and the second sensor data.

14. The method of claim 13, further comprising:
obtaining information indicating a likelihood that an object is located in a path of a recipient vehicle;
wherein generating the one or more advisory messages includes generating an advisory message based on the first sensor data, the second sensor data, and the information indicating the likelihood that the object is located in the path of the recipient vehicle; and
wherein transmitting the one or more advisory messages includes transmitting the advisory message to the recipient vehicle.

15. The method of claim 1, wherein the information further comprises at least one of: (vi) a direction of the one or more obstacles, or (vii) a speed of the one or more obstacles.

16. The method of claim 15, wherein the one or more obstacles comprises at least one of a vehicle, a structure, a vulnerable road user (VRU), or an object.

17. The method of claim 15, wherein the one or more advisory messages comprise a warning message associated with the one or more obstacles in a path of the one or more recipient vehicles.

18. An apparatus for wireless communication, comprising:
a memory; and
one or more processors coupled to the memory, the one or more processors configured to:
receive sensor data from one or more devices, the sensor data comprising information associated with a respective device of the one or more devices, wherein the information comprises: (i) a position of the respective device and an accuracy of the position of the respective device, (ii) a direction of the respective device, (iii) a speed of the respective device, (iv) a position of one or more obstacles, and (v) an accuracy of the position of the one or more obstacles;

generate one or more advisory messages related to the one or more obstacles for one or more recipient vehicles based on the sensor data; and
output the one or more advisory messages for transmission to the one or more recipient vehicles.

19. The apparatus of claim 18, wherein the apparatus is a multi-access edge computing (MEC) device, a base station, a central unit of a base station, or a distributed unit of a base station, and the one or more devices comprises at least one of a vehicle, a base station, a central unit of the base station, or a distributed unit of the base station, a roadside unit (RSU), user equipment (UE), or a network-equipped structure.

20. The apparatus of claim 19, wherein the base station is one of a gNodeB (gNB) or an evolved NodeB (eNB).

21. The apparatus of claim 18, wherein the one or more processors are configured to determine the information from at least a portion of sensing measurements associated with one or more objects in an environment.

22. The apparatus of claim 21, wherein the sensing measurements comprise at least one of radar measurements or light detection and ranging (LIDAR) measurements.

23. The apparatus of claim 18, wherein the one or more processors are configured to:
determine a delivery mechanism for transmission of the one or more advisory messages to a recipient vehicle of the one or more recipient vehicles based on a network capability of the recipient vehicle, wherein the delivery mechanism is one of an infrastructure-to-vehicle (I2V) interface, a universal mobile telecommunications system (UMTS) air interface (Uu), or a visible light communication (VLC) interface.

24. The apparatus of claim 18, wherein the one or more processors are configured to:
determine a priority of transmission of the one or more advisory messages to the one or more recipient vehicles.

25. The apparatus of claim 18, wherein the one or more processors are configured to generate the one or more advisory messages for the one or more recipient vehicles further based on information associated with an environment, wherein the information associated with the environment comprises at least one of weather information, traffic information, pedestrian information, lighting conditions information, road topology information, or obstructions information.

26. The apparatus of claim 18, wherein the one or more processors are configured to generate the one or more advisory messages for the one or more recipient vehicles further based on information indicating a likelihood that at least one object is located in a path of at least one of the one or more recipient vehicles.

27. The apparatus of claim 18, wherein the one or more processors are configured to:
receive the sensor data from the one or more devices includes receiving first sensor data from a first device and receiving second sensor data from a second device; and
generate the one or more advisory messages is based on the first sensor data and the second sensor data.

28. The apparatus of claim 27, wherein the one or more processors are configured to:
obtain information indicating a likelihood that an object is located in a path of a recipient vehicle;
wherein generating the one or more advisory messages includes generating an advisory message based on the first sensor data, the second sensor data, and the information indicating the likelihood that the object is located in the path of the recipient vehicle; and wherein transmitting the one or more advisory messages includes transmitting the advisory message to the recipient vehicle.

29. The apparatus of claim 18, wherein the information further comprises at least one of: (vi) a direction of the one or more obstacles, or (vii) a speed of the one or more obstacles.

30. The apparatus of claim 29, wherein the one or more advisory messages comprise a warning message associated with the one or more obstacles in a path of the one or more recipient vehicles.

\* \* \* \* \*